United States Patent
Nakamoto et al.

(10) Patent No.: US 10,480,114 B2
(45) Date of Patent: Nov. 19, 2019

(54) DRUM WASHING MACHINE

(71) Applicants: HAIER ASIA CO., LTD., Tokyo (JP); QINGDAO HAIER WASHING MACHINE CO., LTD., Qingdao, Shandong (CN)

(72) Inventors: Shigeharu Nakamoto, Tokyo (JP); Hiromi Hirota, Tokyo (JP); Harumi Takeuchi, Tokyo (JP); Takahiro Tsuji, Tokyo (JP); Satoshi Hirose, Tokyo (JP); Masanori Yoneda, Tokyo (JP)

(73) Assignees: HAIER ASIA CO., LTD., Tokyo (JP); QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 199 days.

(21) Appl. No.: 15/557,127

(22) PCT Filed: Jul. 7, 2016

(86) PCT No.: PCT/CN2016/089069
§ 371 (c)(1),
(2) Date: Sep. 11, 2017

(87) PCT Pub. No.: WO2017/005203
PCT Pub. Date: Jan. 12, 2017

(65) Prior Publication Data
US 2018/0044842 A1    Feb. 15, 2018

(30) Foreign Application Priority Data

Jul. 9, 2015 (JP) ................................. 2015-138066

(51) Int. Cl.
*D06F 39/04* (2006.01)
*D06F 37/40* (2006.01)
(Continued)

(52) U.S. Cl.
CPC ............ *D06F 39/045* (2013.01); *D06F 23/06* (2013.01); *D06F 37/06* (2013.01); *D06F 37/304* (2013.01);
(Continued)

(58) Field of Classification Search
CPC .......... D06F 23/02; D06F 23/06; D06F 33/02; D06F 35/005; D06F 37/06; D06F 37/36;
(Continued)

(56) References Cited

U.S. PATENT DOCUMENTS 5,327,603 A    7/1994  Roh et al.
6,044,510 A    4/2000  Cho
(Continued)

FOREIGN PATENT DOCUMENTS

CN    1235215    11/1999
CN    2576758    10/2003
(Continued)

OTHER PUBLICATIONS

Machine translation of JP 2015-058244 A to Panasonic Corp. (Year: 2015).*
(Continued)

*Primary Examiner* — Joseph L. Perrin
(74) *Attorney, Agent, or Firm* — Greenberg Traurig, LLP

(57) ABSTRACT

A drum washing machine, including: a driving part, capable of operating in a uniaxial driving form and a biaxial driving form; a heater configured to heat water stored in the outer drum for washing; and a control part which at least performs washing operation of a first washing mode and a second washing mode. In a washing process of the first washing mode, the control part enables the driving part to operate in the uniaxial driving form and also enables the heater to operate. Further, in a washing process of the second washing mode, the control part enables the driving part to operate in (Continued)

the biaxial driving form and also enables the heater to operate in such a manner that heat applied to the water is reduced compared with the first washing mode.

6 Claims, 17 Drawing Sheets

(51) Int. Cl.
| | | |
|---|---|---|
| *D06F 37/06* | (2006.01) | |
| *D06F 23/06* | (2006.01) | |
| *D06F 37/30* | (2006.01) | |
| *D06F 39/08* | (2006.01) | |
| *D06F 37/36* | (2006.01) | |
| *D06F 39/00* | (2006.01) | |
| *D06F 39/02* | (2006.01) | |

(52) U.S. Cl.
CPC ............ *D06F 37/40* (2013.01); *D06F 39/083* (2013.01); *D06F 39/087* (2013.01); *D06F 39/088* (2013.01); *D06F 37/36* (2013.01); *D06F 39/005* (2013.01); *D06F 39/02* (2013.01); *D06F 2202/04* (2013.01); *D06F 2202/10* (2013.01); *D06F 2204/04* (2013.01); *D06F 2204/065* (2013.01); *D06F 2204/084* (2013.01); *D06F 2204/086* (2013.01); *D06F 2204/10* (2013.01)

(58) Field of Classification Search
CPC ...... D06F 37/40; D06F 37/304; D06F 39/004; D06F 39/005; D06F 39/02; D06F 39/04; D06F 39/045; D06F 39/083; D06F 39/087; D06F 39/088
See application file for complete search history.

(56) References Cited

U.S. PATENT DOCUMENTS

| | | | |
|---|---|---|---|
| 7,331,202 B2 * | 2/2008 | Park ....................... | D06F 17/06 68/131 |
| 2003/0061840 A1 | 4/2003 | Hird | |

FOREIGN PATENT DOCUMENTS

| | | |
|---|---|---|
| CN | 1724743 | 1/2006 |
| CN | 1888193 | 1/2007 |
| CN | 1928198 | 3/2007 |
| CN | 203890713 | 10/2014 |
| CN | 203890716 | 10/2014 |
| EP | 0957194 | 11/1999 |
| JP | 2006158488 | 6/2006 |
| JP | 2008104684 | 5/2008 |
| JP | 2008289680 | 12/2008 |
| JP | 2015058244 | 3/2015 |

OTHER PUBLICATIONS

International Patent Application No. PCT/CN2016/089069, International Search Report, dated Oct. 12, 2016.
European Patent Application 16820854.4, European Search Report, dated Sep. 24, 2018.

* cited by examiner

Second target temperature < First target temperature

DRUM WASHING MACHINE

The present application is a national phase application under 35 U.S.C. § 371 of International Patent Application PCT/CN2016/089069, filed on Jul. 7, 2016, which claims priority to Japanese Patent Application No. 2015-138066, filed Jul. 9, 2015, the entire disclosures of which applications are incorporated herein by reference.

TECHNICAL FIELD

The present disclosure relates to a drum washing machine, which not only can be continuously operated from washing to drying, but also can carry out washing without drying.

BACKGROUND

In the past, a drum washing machine rotates a transverse-shaft type drum in an outer drum which stores water at a bottom, washings are lifted up and dropped down by baffles arranged in the drum, and the washings are thrown to an inner circumferential surface of the drum to wash the washings (with reference to patent literature 1).

In this way, in a structure of stirring the washings by the baffles, the washings are difficult to twine or rub against each other. Therefore, compared with an automatic washing machine which washes the washings through rotation of a pulsator in a washing and dewatering drum, the drum washing machine has mechanical force, acting on the washings, easy to get small, and has washing performance easy to lower.

Therefore, for the drum washing machine, in order to improve the washing performance, the following structure may be adopted: a heater is configured in the outer drum and water stored in the outer drum is heated through the heater.

Under a condition of adopting the structure that the water in the outer drum is heated through the heater, power consumption required for washing operation is easy to increase.

CURRENT TECHNICAL LITERATURE

Patent Literature

Patent Literature 1: Japanese Laid-Open Patent Publication No. 2013-240577

SUMMARY

Problems to be Solved in the Disclosure

The present disclosure is a technical solution completed in view of the problem. The purpose of the present disclosure is to provide a drum washing machine, capable of enhancing washing performance while inhibiting increase of power consumption.

Solution for Solving the Problems

The drum washing machine in a main mode of the present disclosure includes: an outer drum, configured in a shell; a drum, configured in the outer drum and capable of rotating by using a horizontal axis or an inclination axis inclining relative to a horizontal direction as a center; a rotating body, configured in the drum and provided with a protruding part in contact with washings on a surface; a driving part, capable of operating in a first driving form and a second driving form, wherein the first driving form is a driving form that enables the drum and the rotating body to integrally rotate at a same rotating speed or enables the drum to rotate and the rotating body to be in a free rotation state and the second driving form is a driving form that enables the drum and the rotating body to rotate at different rotating speeds; a heater configured to heat water stored in the outer drum for washing; and a control part which at least performs washing operation of a first washing mode and a second washing mode. Herein, in a washing process of the first washing mode, the control part enables the driving part to operate in the first driving form and also enables the heater to operate. Further, in a washing process of the second washing mode, the control part enables the driving part to operate in the second driving form, and enables the heater to operate in such a manner that heat applied to the water is reduced compared with the first washing mode or enables the heater not to operate.

Through the above structure, in the first washing mode, since mechanical force produced by the rotating body is not applied, even if the washings cannot bear stronger mechanical force, cloth can be prevented from being damaged; and moreover, since a water temperature in the outer drum is increased, capability of detergents can be increased, so as to well wash the washings. Further, in the second washing mode, since the mechanical force produced by rotation of the rotating body can be applied to the washings besides the mechanical force produced by rotation of the drum, the washings can be reliably washed; and moreover, since power supply for the heater is inhibited or the heater is not powered compared with the first washing mode, power consumption required for washing operation can be inhibited.

The drum washing machine in the present embodiment can adopt a structure further including a temperature sensor. The temperature sensor is configured to detect a temperature of the water stored in the outer drum and heated by the heater. In this case, in the washing process of the first washing mode, the control part enables the heater to operate in such a manner that a detection temperature of the temperature sensor reaches a first target temperature, and in the washing process of the second washing mode, the control part enables the heater to operate in such a manner that a detection temperature of the temperature sensor reaches a second target temperature lower than the first target temperature.

Through the above structure, in the second washing mode, by setting the target temperature to be lower than that in the first washing mode, the control part enables the heater to operate in such a manner that heat applied to the water is reduced compared with the first washing mode.

The drum washing machine in the present embodiment can adopt a structure further including a temperature sensor configured to detect a temperature of the water stored in the outer drum and heated by the heater. In this case, in the washing process of the first washing mode, the control part enables the heater to operate in such a manner that a detection temperature of the temperature sensor reaches a target temperature, and controls the heater in such a manner that a detection temperature of the temperature sensor keeps the target temperature after reaching the target temperature; and in the washing process of the second washing mode, the control part enables the heater to operate in such a manner that a detection temperature of the temperature sensor reaches the target temperature, and stops the heater after reaching the target temperature.

Through the above structure, the heater is enabled to operate in the second washing mode in such a manner that the heat applied to the water is reduced compared with the first washing mode by controlling the heater in a manner of keeping the target temperature after reaching the target temperature in the first washing mode and stopping the heater after reaching the target temperature in the second washing mode.

Moreover, since the water temperature in the outer drum is briefly increased to the same target temperature as the first washing mode, an effect of warm water at the target temperature can be obtained within a period of time.

The drum washing machine in the present embodiment can adopt a structure further including a dirt sensor configured to detect a dirt degree of washings. In this case, in the washing process of the second washing mode, the control part enables the heater to operate under a condition that the dirt degree detected by the dirt sensor is greater than a specified threshold, and enables the heater not to operate under a condition that the dirt degree detected by the dirt sensor is less than the threshold.

Through the above structure, a drum washing machine can be realized. Since the heater is not operated under the condition that the dirt degree of the washings is small in the washing process of the second washing mode, the power consumption can be further reduced.

Effects of the Disclosure

According to the present disclosure, a drum washing machine is provided, capable of enhancing washing performance while inhibiting increase of power consumption.

Effects and significances of the present disclosure are further clarified by embodiments shown below. However, the following embodiments are just an illustration when the present disclosure is implemented, and the present disclosure is not limited by any content described in the following embodiments.

LIST OF REFERENCE NUMERALS

10. Shell; 20. Outer drum; 22. Drum; 24. Rotating body; 24a. Protruding part; 30. Driving part; 60. Heater; 61. Temperature sensor; 70. Dirt sensor; 701. Control part.

DETAILED DESCRIPTION

Hereinafter, an embodiment of a drum washing machine in the present disclosure, i.e., a drum washing machine without a clothes drying function, is described by referring to drawings.

Figure 1:
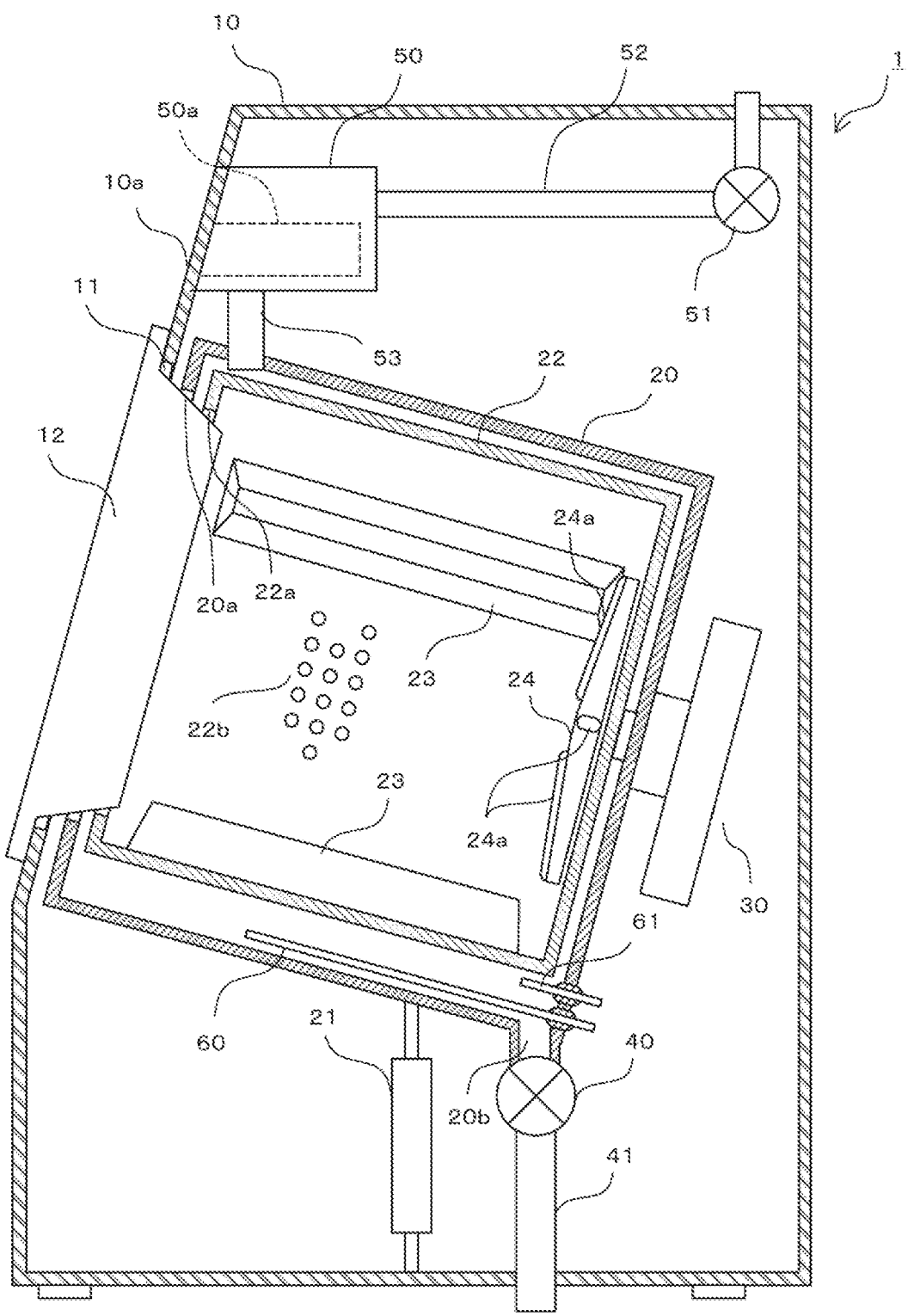
FIG. 1 is a side sectional view illustrating a structure of a drum washing machine in embodiments.

FIG. 1 is a side sectional view illustrating a structure of a drum washing machine 1.

The drum washing machine 1 includes a shell 10 forming an appearance. A front surface 10a of the shell 10 is inclined from a central part to an upper part, and a throwing inlet 11 of washings is formed in the inclined surface. The throwing inlet 11 is covered by a door 12 which is freely openable and closable.

An outer drum 20 is elastically supported by a plurality of vibration dampers 21 in the shell 10. A drum 22 is configured in the outer drum 20 in a free rotation manner. The outer drum 20 and the drum 22 are inclined in such a manner that a rear surface side is lowered relative to a horizontal direction. Thus, the drum 22 rotates by taking an inclination axis inclining relative to the horizontal direction as a center. An inclination angle of the outer drum 20 and the drum 22 may be set as about 10-20 degrees. An opening part 20a on the front surface of the outer drum 20 and an opening part 22a on the front surface of the drum 22 are opposite to the throwing inlet 11, and are closed by the door 12, together with the throwing inlet 11. A plurality of dewatering holes 22b are formed in a circumferential wall of the drum 22. Further, three baffles 23 are arranged in the circumferential direction at roughly equal intervals on the inner circumferential surface of the drum 22.

A rotating body 24 is configured at the rear part of the drum 22 in a free rotation manner. The rotating body 24 has a roughly disc shape. A plurality of protruding parts 24a that radially extend from the central part are formed in the surface of the rotating body 24. The rotating body 24 coaxially rotates with the drum 22.

A driving part 30 capable of generating a torque for driving the drum 22 and the rotating body 24 is configured at the rear part of the outer tank 20. The driving part 30 enables the drum 22 and the rotating body 24 to rotate at different rotating speeds in the same direction in a washing process and a rinsing process. Specifically, the driving part 30 enables the drum 22 to rotate at a rotating speed through which centrifugal force applied to the washings in the drum 22 is smaller than gravity, and the rotating body 24 rotates at a rotating speed higher than the rotating speed of the drum 22. It should be noted that the driving part 30 enables the drum 22 and the rotating body 24 to integrally rotate in the same direction at a rotating speed through which centrifugal force applied to the washings in the drum 22 is smaller than gravity sometimes according to a washing mode in a washing process and a rinsing process.

On the other hand, the driving part 30 enables the drum 22 and the rotating body 24 to integrally rotate at a rotating speed through which the centrifugal force applied to the washings in the drum 22 is much larger than the gravity in a dewatering process. A detailed structure of the driving part 30 is described below.

A water outlet part 20b is formed in the bottom of the outer tank 20. A drainage valve 40 is configured in the water outlet part 20b. The drainage valve 40 is connected with a drainage hose 41. When the drainage valve 40 is opened, water stored in the outer drum 20 is discharged out of the machine by the drainage hose 41.

A detergent box 50 is configured on the upper part of the front in the shell 10. A detergent container 50a containing detergents is contained in the detergent box 50 in a free withdrawal manner from the front. The detergent box 50 is connected with a water supply valve 51 configured on the upper part at the rear part in the shell 10 through the water supply hose 52. In addition, the detergent box 50 is connected with the upper part of the outer drum 20 through a water injection pipe 53. When the water supply valve 51 is opened, running water from a faucet is supplied into the outer drum 20 by virtue of a water supply hose 52, the detergent box 50 and the water injection pipe 53. At this moment, detergents contained in the detergent container 50a are supplied into the outer drum 20 along with a water flow.

At the bottom of the outer drum 20, to heat the water supplied into the outer drum 20, a heater 60 is configured. Further, In the vicinity of the heater 60, to detect the temperature of the heated water, a temperature sensor 61 is configured.

Then, a structure of the driving part 30 is described in detail.

Figure 2:
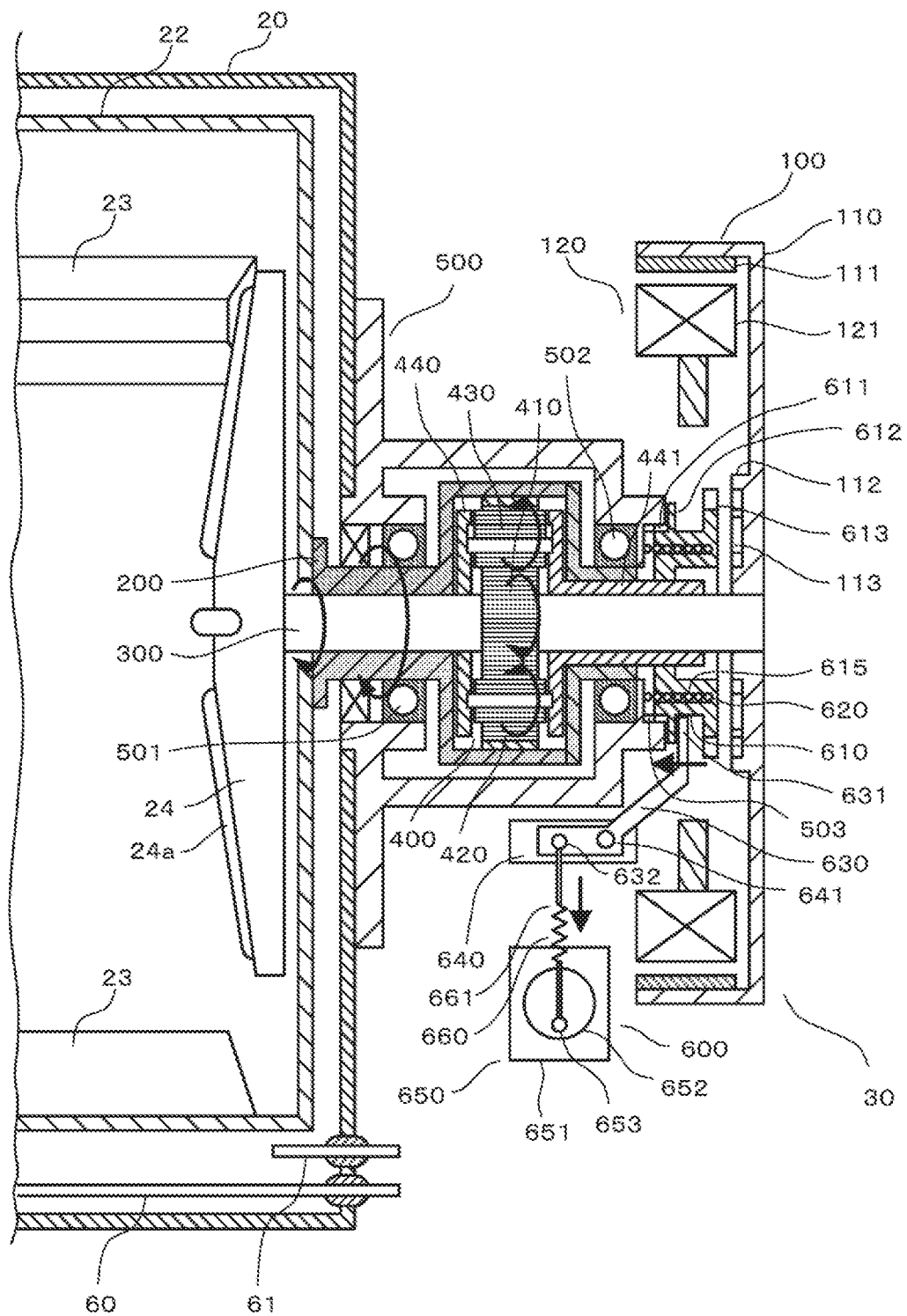
FIG. 2 is a sectional view illustrating a structure of a driving part in embodiments.
Figure 3:
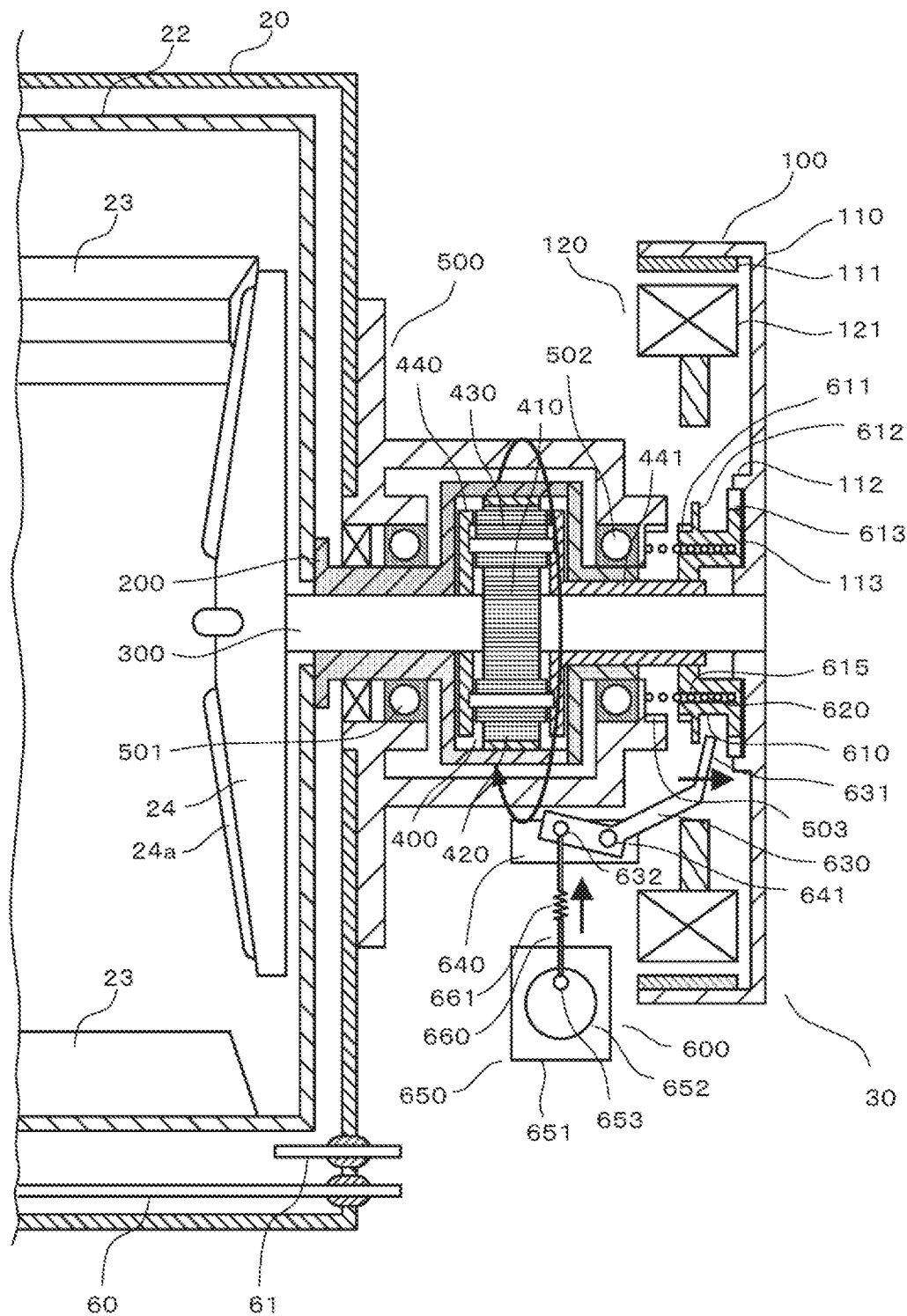
FIG. 3 is a sectional view illustrating a structure of a driving part in embodiments.
Figure 4:
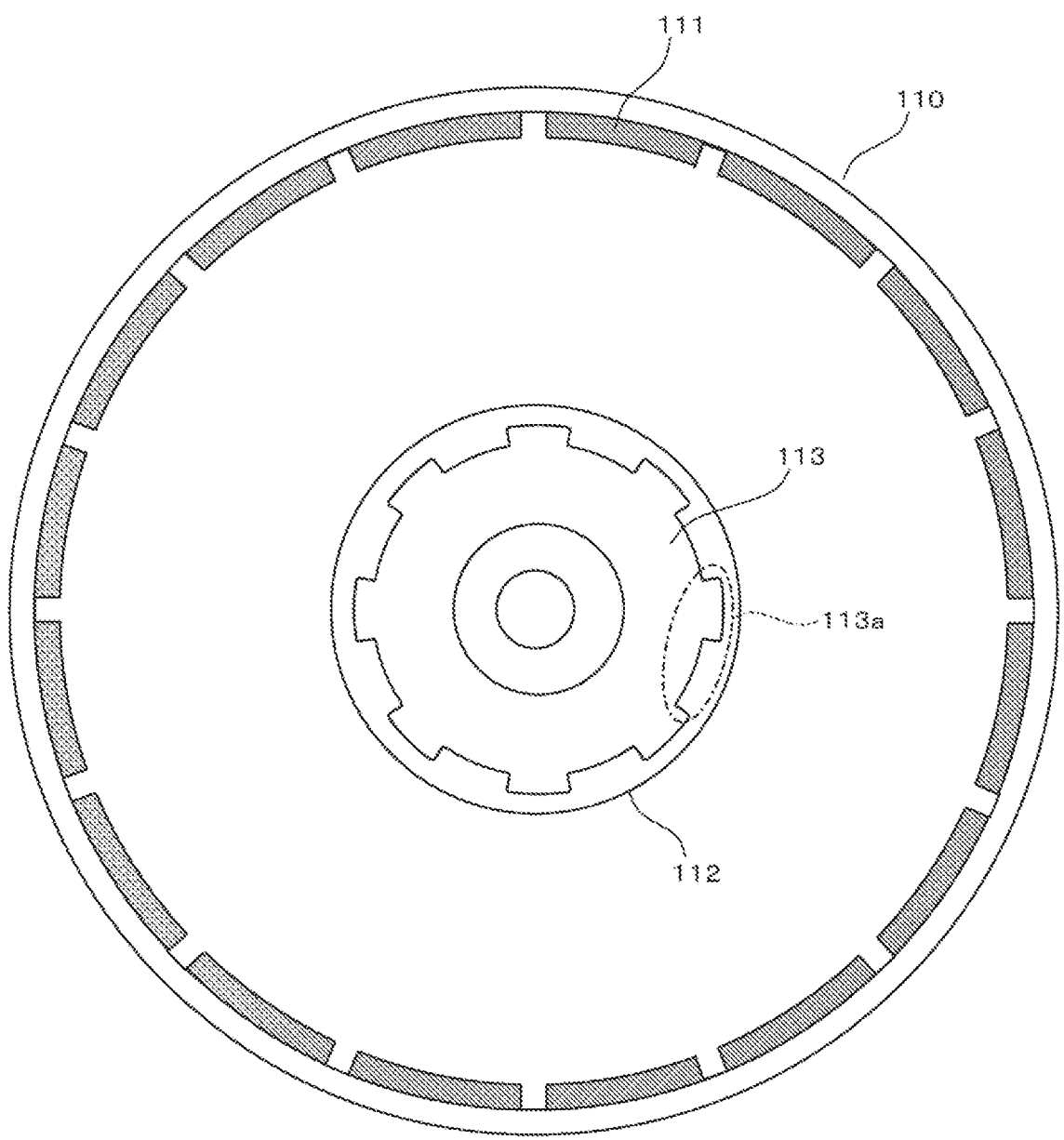
FIG. 4 is a rotor main view illustrating a rotor structure of a driving motor in embodiments.
Figure 5:
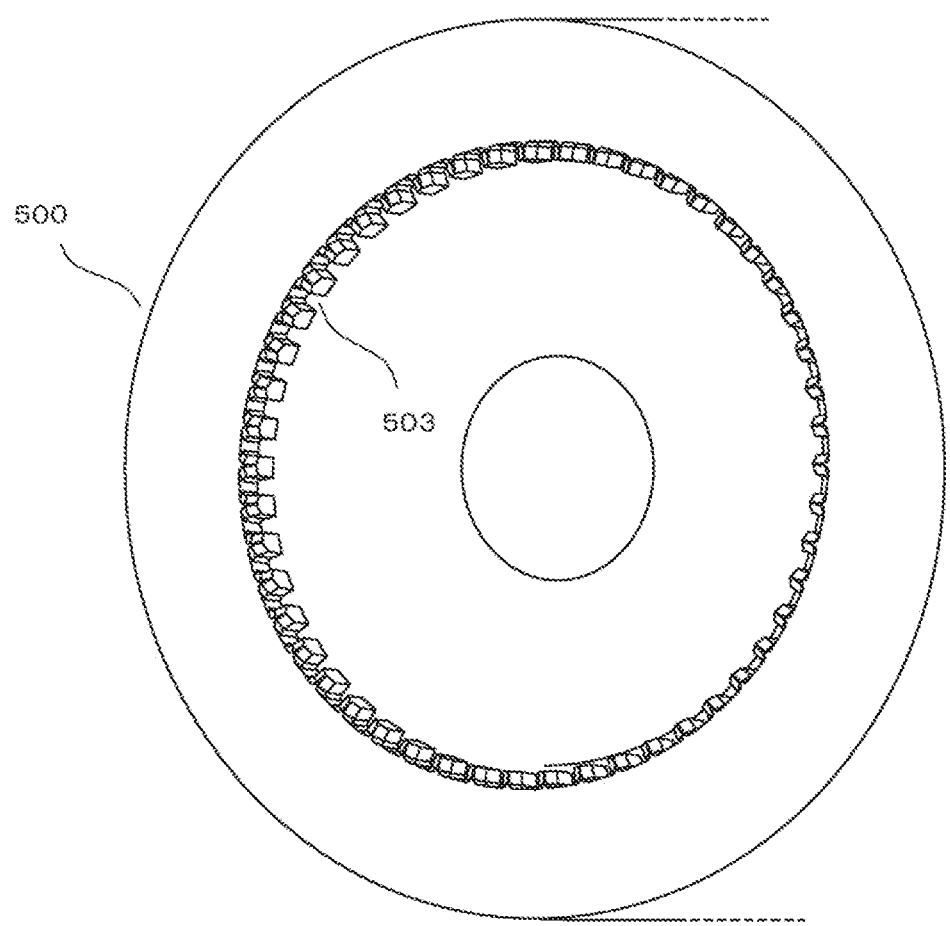
FIG. 5 is an enlarged stereoscopic drawing illustrating a rear part of a bearing unit with a spline in embodiments.
Figure 6:
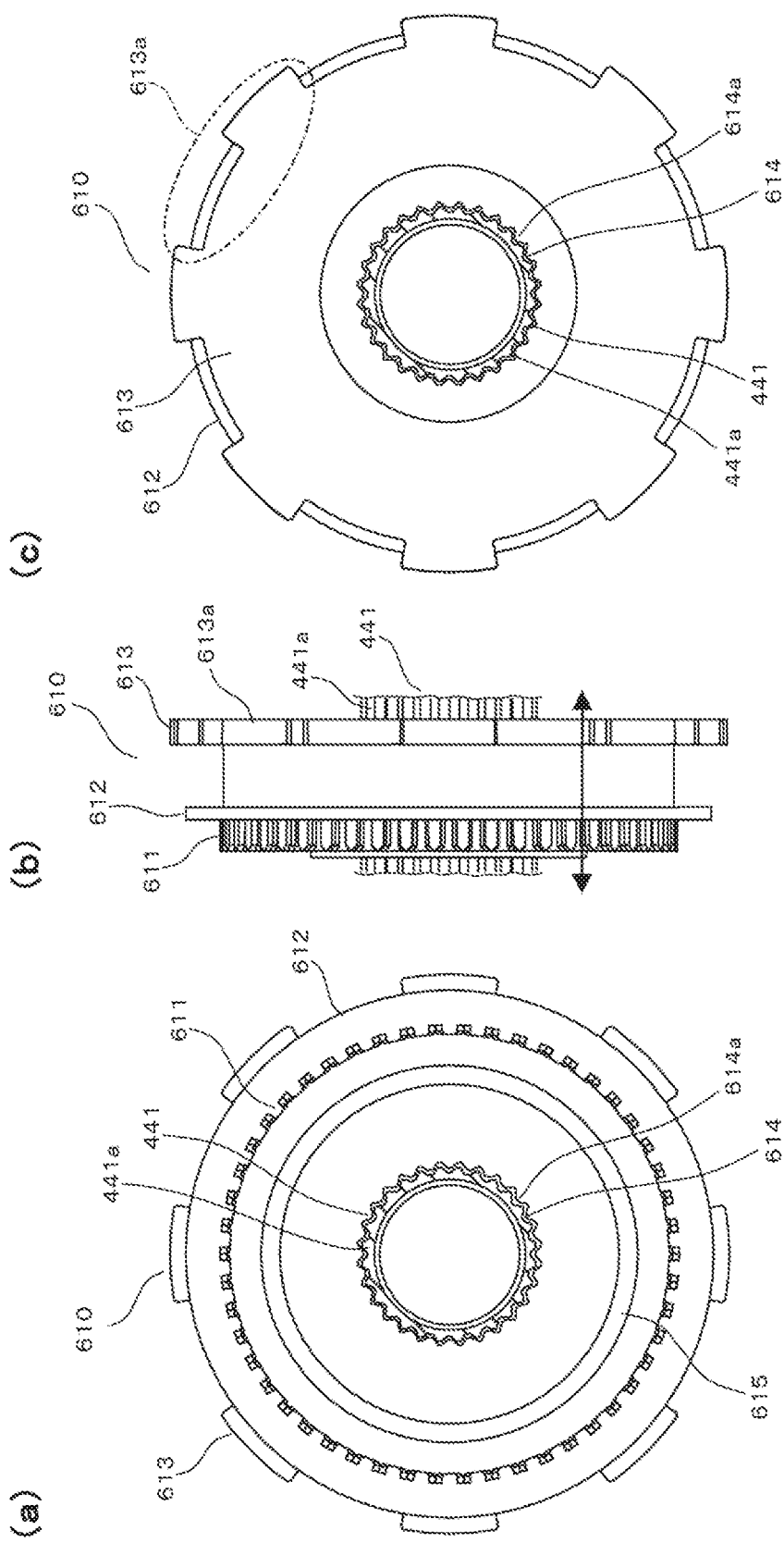
FIG. 6 is a diagram illustrating a structure of a clutch body of a clutch mechanism part in embodiments.

FIG. 2 and FIG. 3 are sectional views illustrating a structure of the driving part 30. FIG. 2 shows a state of switching a driving form of the driving part 30 to a biaxial driving form. FIG. 3 shows a state of switching a driving form of the driving part 30 to a uniaxial driving form. FIG. 4 is a main view illustrating a rotor 110 for a structure of a rotor 110 of a driving motor 100. FIG. 5 is an enlarged stereoscopic drawing illustrating a rear part of a bearing unit 500 with a spline 503. FIGS. 6(a)-(c) are diagrams illustrating a structure of a clutch body 610 of a clutch mechanism part 600, i.e., a main view, a right view and a rear view of the clutch body 610.

The driving part 30 includes: a driving motor 100, a first rotating shaft 200, a second rotating shaft 300, a planetary gear mechanism 400, a bearing unit 500 and a clutch mechanism part 600.

The driving motor 100 is an external rotor type DC brushless motor and generates torques for driving the rotating body 24 and the drum 22. The driving motor 100 includes a rotor 110 and a stator 120. The rotor 110 is formed in a bottomed cylinder shape, and permanent magnets 111 are arranged throughout the entire circumference on the inner circumferential surface of the rotor 110. A circular protruding part 112 fixed to the second rotating shaft 300 is formed on the central part of the rotor 110. An annular engaged recess part 113 is formed on the protruding part 112. As shown in FIG. 4, uneven parts 113a are formed on the outer circumferential surface in the engaged recess part 113 throughout the entire circumference.

A coil 121 is arranged on the outer circumferential part of the stator 120. When power is supplied to the coil 121 of the stator 120 from an aftermentioned motor driving part, the rotor 110 rotates.

The first rotating shaft 200 is of a hollow shape and internally encircles the second rotating shaft 300 and the planetary gear mechanism 400. The central part of the first rotating shaft 200 is bulged outwards. The bulged part forms a containing part of the planetary gear mechanism 400.

The planetary gear mechanism 400 decelerates and transmits rotation of the second rotating shaft 300, i.e., rotation of the rotor 110 of the driving motor 100, to the first rotating shaft 200. The planetary gear mechanism 400 includes: a sun gear 410, an annular inner gear 420 encircling the sun gear 410, a plurality of groups of planetary gears 430 between the sun gear 410 and the inner gear 420, and a planet carrier 440 keeping the planetary gears 430 in a free rotation manner.

The sun gear 410 is fixed to the second rotating shaft 300, and the inner gear 420 is fixed to the first rotating shaft 200. A group of planetary gears 430 includes a first gear and a second gear which are engaged mutually and rotated in reverse directions. The planet carrier 440 includes a planet carrier shaft 441 extending backwards. The planet carrier shaft 441 is coaxial with the first rotating shaft 200, and is internally hollowed to be inserted by the second rotating shaft 300.

A rear end part of the second rotating shaft 300 is protruded backwards from the planet carrier shaft 441, and is fixed to the protruding part 112 of the rotor 110.

The bearing unit 500 rotatably supports the first rotating shaft 200 through two bearings 501 and 502 arranged in the bearing unit 500. As shown in FIG. 5, splines 503 are formed throughout the entire circumference on the inner surface at the rear end part of the bearing unit 500. The bearing unit 500 is fixed to a rear surface of the outer drum 20. In this state, the first rotating shaft 200 and the second rotating shaft 300 enter the outer drum 20. The drum 22 is fixed to the first rotating shaft 200, and the rotating body 24 is fixed to the second rotating shaft 300.

The clutch mechanism part 600 switches a driving form of the driving part 30 between a biaxial driving form and a uniaxial driving form, wherein the biaxial driving form is a driving form that enables the drum 22 and the rotating body 24 to independently rotate in such a manner that the rotating body 24 rotates at a rotating speed higher than that of the drum 22, and the uniaxial driving form is a driving form that enables the drum 22 and the rotating body 24 to integrally rotate in such a manner that the drum 22 and the rotating body 24 rotate at the same rotating speed. The uniaxial driving form is equivalent to a first driving form of the present disclosure, and the biaxial driving form is equivalent to a second driving form of the present disclosure.

The clutch mechanism part 600 includes: a clutch body 610, a clutch spring 620, a clutch lever 630, a lever supporting part 640, a clutch driving apparatus 650 and a relay rod 660.

As shown in FIGS. 6(a)-(c), the clutch body 610 has a roughly disc shape. An annular spline 611 is formed on an outer circumferential surface at a front end part of the clutch body 610. The spline 611 is formed to be engaged with the spline 503 of the bearing unit 500. In addition, A flange part 612 is formed on the outer circumferential surface of the clutch body 610 at a rear part of the spline 611. Further, an annular engaging flange part 613 is formed at a rear end part of the clutch body 610. The engaging flange part 613 has a same shape as the engaged recess part 113 of the rotor 110, and has an uneven part 613a throughout the entire circumference at the outer circumferential part. When the engaging flange part 613 is inserted into the engaged recess part 113, the uneven parts 613a and 113a are mutually engaged.

The planet carrier shaft 441 is inserted into a shaft hole 614 of the clutch body 610. A spline 614a formed on an inner circumferential surface of the shaft hole 614 and a spline 441a formed on an outer circumferential surface of the planet carrier shaft 441 are engaged. Thus, the clutch body 610 is in a state capable of moving forwards and backwards relative to the planet carrier shaft 441 and incapable of rotating circumferentially.

On the clutch body 610, an annular containing tank 615 is formed in an outer side of the shaft hole 614. The containing tank 615 contains a clutch spring 620. One end of the clutch spring 620 is connected with the rear end part of the bearing unit 500, and the other end is connected with a bottom surface of the containing tank 615.

On an upper end part of the clutch lever 630, a push-press part 631 contacted with a rear surface of the flange part 612 of the clutch body 610 and configured to push the flange part 612 forwards is formed. The clutch lever 630 is supported by a supporting shaft 641 arranged on the lever supporting part 640 in a free rotation manner. An installing shaft 632 is formed at a lower end part of the clutch lever 630.

The clutch driving apparatus 650 is configured under the clutch lever 630. The clutch driving apparatus 650 includes a torque motor 651 and a disc-shaped cam 652 which rotates around a horizontal axis through a torque of the torque motor 651. At an upper surface of the cam 652, a camshaft 653 is arranged at an outer circumferential part. A rotation center of the cam 652 and a center of the installing shaft 632 of the clutch lever 630 are consistent in forward and backward directions.

The relay rod 660 extends to upward and downward directions and is connected with the clutch lever 630 and the cam 652. An upper end part of the relay rod 660 is installed on the installing shaft 632 of the clutch lever 630, and a lower end part is installed on the camshaft 653 of the cam 652. A spring 661 is integrally formed in a middle position of the relay rod 660.

The lever supporting part 640 and the clutch driving apparatus 650 are fixed to the bearing unit 500, for example, through an installing plate not shown in figures.

Under a condition that the driving form of the driving part 30 is switched from the uniaxial driving form to the biaxial driving form, as shown in FIG. 2, the cam 652 is rotated through the torque motor 651 in such a manner that the camshaft 653 is located at a lowest part. With the rotation of the cam 652, the lower end part of the clutch lever 630 is pulled to a lower part by the relay rod 660. The clutch lever 630 rotates forwards by taking the supporting shaft 641 as a center. The push-press part 631 pushes the clutch body 610 forwards. The clutch body 610 resists elasticity of the clutch spring 620 to move forwards. A spline 611 of the clutch body 610 and a spline 503 of the bearing unit 500 are engaged.

When the camshaft 653 moves to a middle specified position, the clutch body 610 reaches an engaging position of the spline 611 and the spline 503. At this moment, the spring 661 of the relay rod 660 is in a state of natural length. Since the clutch body 610 does not move to a position more forward than the engaging position, when the camshaft 653 moves from the specified position to the lowest position, as shown in FIG. 2, the spring 661 extends to the lower part. In this way, since the clutch lever 630 is pulled by the spring 661 in a forward rotation manner, push-press force is applied to the clutch body 610 in the engaging position by the push-press part 631. Thus, the spline 611 and the spline 503 are tightly engaged.

When the spline 611 and the spline 503 are engaged, since the clutch body 610 is in a state incapable of rotating circumferentially relative to the bearing unit 500, the planet carrier shaft 441 of the planetary gear mechanism 400, i.e., the planet carrier 440, is in a state of being fixed not to rotate. In this state, when the rotor 110 rotates, the second rotating shaft 300 rotates at a same rotating speed as that of the rotor 110, and the rotating body 24 connected with the second rotating shaft 300 also rotates at a same rotating speed as that of the rotor 110. With the rotation of the second rotating shaft 300, the sun gear 410 rotates in the planetary gear mechanism 400. As mentioned above, since the planet carrier 440 is in a state of being fixed, a first gear and a second gear of the planetary gear 430 respectively rotate in a reverse direction and a same direction as the sun gear 410 and the inner gear 420 rotates in a same direction as the sun gear 410. Thus, the first rotating shaft 200 fixed to the inner gear 420 rotates in the same direction as the second rotating shaft 300 at a rotating speed lower than that of the second rotating shaft 300, and the drum 22 fixed to the first rotating shaft 200 rotates in the same direction as the rotating body 24 at a rotating speed lower than that of the rotating body 24. In other words, the rotating body 24 rotates in the same direction as the drum 22 at a rotating speed higher than that of the drum 22.

On the other hand, under a condition that the form of the driving part 30 is switched from the biaxial driving form to the uniaxial driving form, as shown in FIG. 3, the cam 652 is rotated through the torque motor 651 in such a manner that the camshaft 653 is located at an uppermost part. When the cam 652 rotates and the camshaft 653 moves upwards, the spring 661 is contracted first. When the spring 661 restores to the natural length, then with the movement of the camshaft 653, the relay rod 660 moves upwards, and the lower end part of the clutch lever 630 is pushed by the relay rod 660 and moves upwards. The clutch lever 630 rotates backwards by taking the supporting shaft 641 as a center, and the push-press part 631 leaves the flange part 612 of the clutch body 610. The clutch body 610 moves backwards through elasticity of the clutch spring 620, and the engaging flange part 613 of the clutch body 610 and the engaged recess part 113 of the rotor 110 are engaged.

When the engaging flange part 613 and the engaged recess part 113 are engaged, since the clutch body 610 cannot rotate circumferentially relative to the rotor 110, the clutch body 610 is in a state capable of rotating together with the rotor 110. In this state, when the rotor 110 rotates, the second rotating shaft 300 and the clutch body 610 rotate at a same rotating speed as that of the rotor 110. At this moment, in the planetary gear mechanism 400, the sun gear 410 and the planet carrier 440 rotate at a same rotating speed as that of the rotor 110. Thus, the inner gear 420 rotates at a same rotating speed as that of the sun gear 410 and the planet carrier 440, and the first rotating shaft 200 fixed to the inner gear 420 rotates at a same rotating speed as that of the rotor 110. Namely, in the driving part 30, the second rotating shaft 300, the planetary gear mechanism 400 and the first rotating shaft 200 integrally rotate. Thus, the drum 22 and the rotating body 24 integrally rotate.

Figure 7:
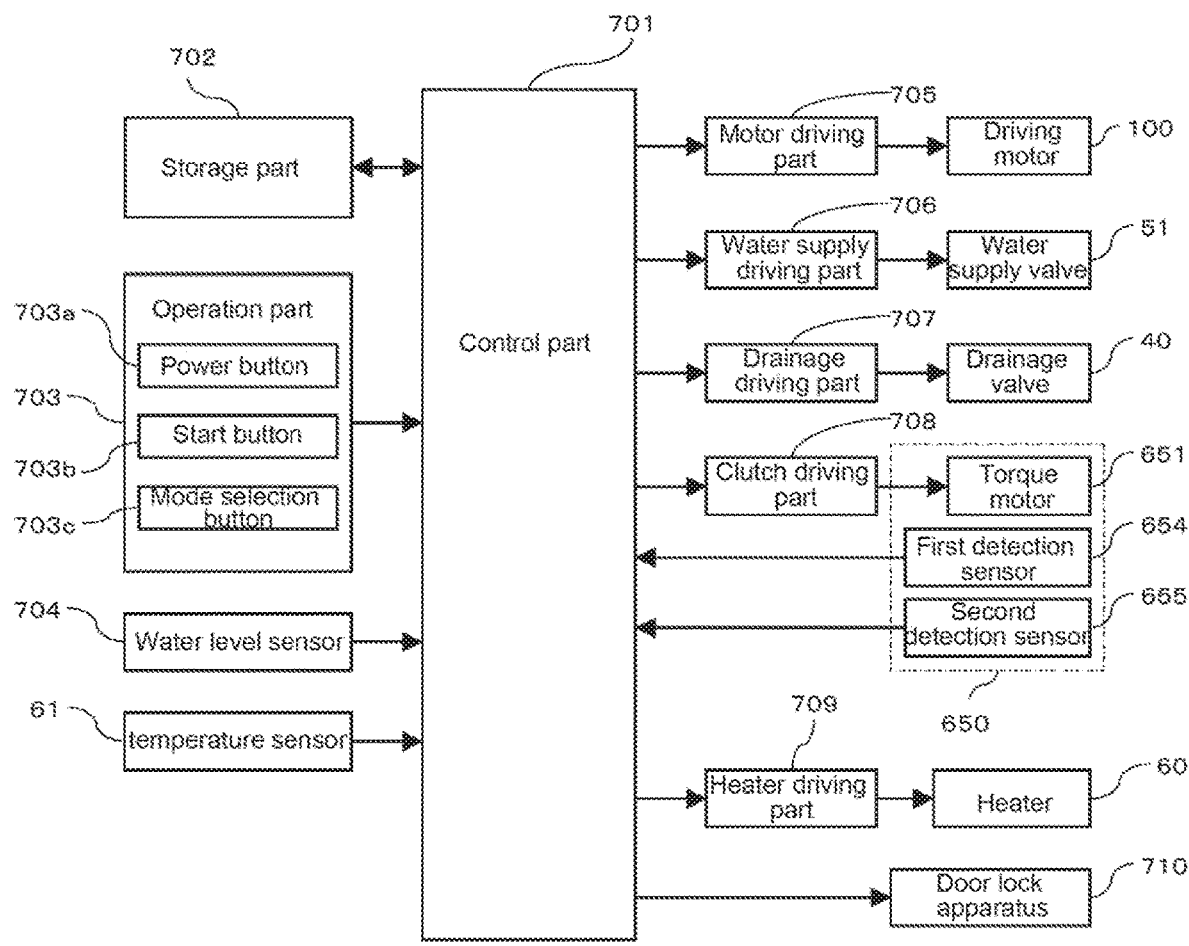
FIG. 7 is a block diagram illustrating a structure of a drum washing machine in embodiments.

FIG. 7 is a block diagram illustrating a structure of a drum washing machine 1.

Besides the above structure, the drum washing machine 1 further includes: a control part 701, a storage part 702, an operation part 703, a water level sensor 704, a motor driving part 705, a water supply driving part 706, a drainage driving part 707, a clutch driving part 708, a heater driving part 709 and a door lock apparatus 710.

The operation part 703 includes: a power button 703*a*, a start button 703*b* and a mode selection button 703*c*. The power button 703*a* is a button for turning on and off a power supply of the drum washing machine 1. The start button 703*b* is a button for starting the operation. The mode selection button 703*c* is a button for selecting any washing mode from a plurality of washing modes for the washing operation. The operation part 703 outputs an input signal corresponding to a button operated by a user to the control part 701.

The water level sensor 704 detects a water level in the outer drum 20, and outputs a water level detection signal corresponding to the detected water level to the control part 701. The temperature sensor 61 detects a temperature of the water stored in the outer drum 20, and outputs a temperature detection signal corresponding to the detected temperature to the control part 701.

The motor driving part 705 drives the driving motor 100 in accordance with a control signal from the control part 701. The motor driving part 705 includes a speed sensor for detecting the rotating speed of the driving motor 100, a frequency converter circuit and the like, and driving current is adjusted in such a manner that the driving motor 100 rotates at the rotating speed set by the control part 701.

The water supply driving part 706 drives the water supply valve 51 in accordance with the control signal from the control part 701. The drainage driving part 707 drives the drainage valve 40 in accordance with the control signal from the control part 701.

The clutch driving apparatus 650 includes a first detection sensor 654 and a second detection sensor 655. The first detection sensor 654 detects that the driving form of the driving part 30 is switched to the biaxial driving form, and outputs the detection signal to the control part 701. The second detection sensor 655 detects that the driving form of the driving part 30 is switched to the uniaxial driving form, and outputs the detection signal to the control part 701. The clutch driving part 708 drives the torque motor 651 based on the detection signals from the first detection sensor 654 and the second detection sensor 655 and according to the control signal output from the control part 701.

The heater driving part 709 drives the heater 60 according to the control signal output from the control part 701.

The door lock apparatus 710 locks and unlocks a door 12 in accordance with the control signal from the control part 701.

The storage part 702 includes EEPROM, RAM or the like. The storage part 702 stores procedures for executing the washing operation of various washing operation modes. In addition, the storage part 702 stores various parameters and various control marks for the execution of the procedures.

The control part 701 controls the motor driving part 705, the water supply driving part 706, the drainage driving part 707, the clutch driving part 708, the heater driving part 709, the door lock apparatus 710 and the like according to the procedures stored in the storage part 702 based on the signals from the operation part 703, the water level sensor 704, the temperature sensor 61 and the like.

The washing mode performed by the drum washing machine 1 in the present embodiment at least includes a first washing mode and a second washing mode. The first washing mode can adopt a washing mode to wash the washings that less bear mechanical force obtained by actions of the drum 22 and the rotating body 24. For example, a gentle washing mode to wash damageable clothes such as sweaters, woollen sweaters, underwear and the like is sometimes set as the first washing mode. The second washing mode can adopt a washing mode to wash the washings that can bear the mechanical force. For example, a standard mode for general washing is sometimes set as the second washing mode.

In the first washing mode, in a washing process and a rinsing process, the driving part 30 is operated in the uniaxial driving form. In the second washing mode, in the washing process and the rinsing process, the driving part 30 is operated in the biaxial driving form. In addition, in the first washing mode and the second washing mode, in the washing process, the detergent-containing water stored in the outer drum 20 is heated by the heater 60. However, in the second washing mode, the heater 60 is operated in such a manner that heat applied to the water is reduced compared with the first washing mode.

The washing operation of the first washing mode and the second washing mode is described below. The washing operation of the first washing mode is described first.

Figure 8:
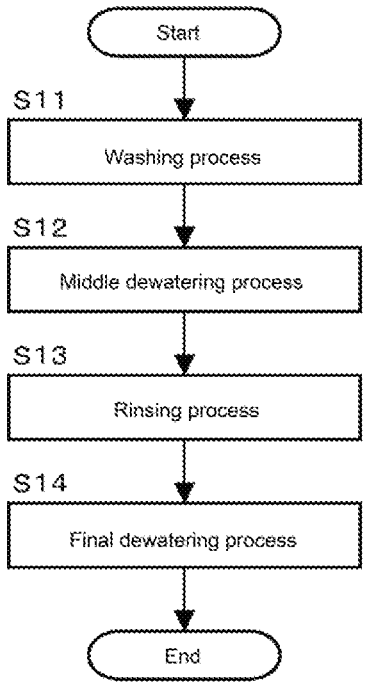
FIG. 8 is a flow chart illustrating control treatment of washing operation of a first washing mode in embodiments, and a flow chart illustrating control treatment of a washing process included in washing operation.
Figure 8:
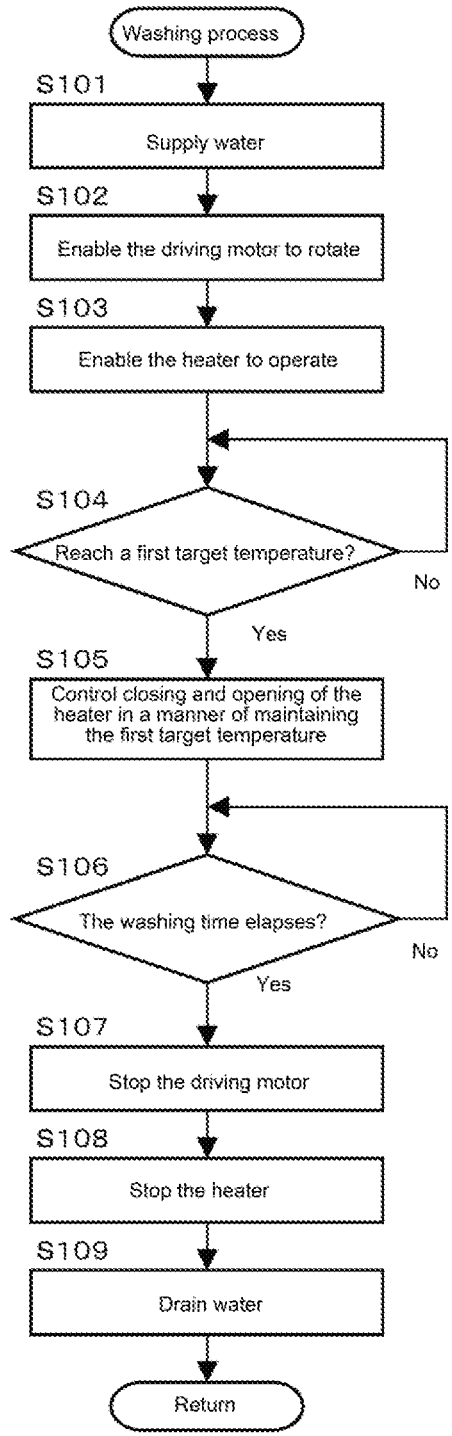

FIG. 8(*a*) is a flow chart illustrating control treatment of washing operation of the first washing mode. FIG. 8(*b*) is a flow chart illustrating control treatment of a washing process included in the washing operation.

When the start button 703*b* is pressed after the first washing mode is selected through the mode selection button 703*c*, the washing operation of the first washing mode is started.

In the present embodiment, the driving form of the driving part 30 before the washing operation is started is set as the uniaxial driving form. With reference to FIG. 8(*a*), when the washing operation is started, the control part 701 keeps the driving form to be in the uniaxial driving form to directly enter the washing process (S11).

With reference to FIG. 8(*b*), the control part 701 opens the water supply valve 51 to supply water into the outer drum 20, so that the detergent-containing water stored in the outer drum 20 reaches the specified water level (S101). At the end of water supply, the control part 701 enables the driving motor 100 to rotate (S102). The drum 22 and the rotating body 24 integrally rotate rightwards and leftwards at a rotating speed through which centrifugal force applied to the washings in the drum 22 is smaller than gravity.

Further, the control part 701 enables the heater 60 to operate (S103). The water in the outer drum 20 is heated through heating of the heater 60. It should be noted that a time point at which the heater 60 is operated can also be set as a same time point as that of starting water supply and a time point at a midway of water supply.

The control part 701 detects the water temperature in the outer drum 20 through the temperature sensor 61, and judges whether the water temperature in the outer drum 20 reaches the first target temperature (S104). The first target temperature can be set as, for example, a temperature of about 40□ to activate enzymes contained in detergents.

When the water temperature in the outer drum 20 reaches the first target temperature (S104: yes), the control part 701 controls closing and opening of the heater 60 in such a manner that the water temperature in the outer drum 20 is kept at the first target temperature (S105). For example, the control part 701 energizes the heater 60 when the water temperature in the outer drum 20 is lower than the first target temperature, and de-energizes the heater 60 when the water temperature in the outer drum 20 exceeds the first target temperature.

The washings in the drum 22 are washed in such a manner that the washings are turned by baffles 23 and thrown to the inner circumferential surface of the drum 22. On the other hand, since the rotating body 24 does not rotate relative to the drum 22, the washings are not rubbed or stirred by the protruding part 24a of the rotating body 24 under rotation. Therefore, even if the washings are damageable clothes, the mechanical force is not excessively applied to the washings and damage to the washings can be prevented.

Further, since the temperature of the detergent-containing water in the outer drum 20 is increased, sebum is easy to be dissolved and removed from the washings. In addition, capability of detergents is increased due to enzyme activation so that a decontamination effect of the washings is better. Thus, even if no great mechanical force is applied to the washings, good washing performance can be obtained.

The control part 701 judges whether a preset washing time is passed (S106). Moreover, when the washing time is passed (S106: yes), the control part 701 stops the driving motor 100 (S107) and stops the heater 60 (S108). The control part 701 opens the drainage valve 40 to drain water from the outer drum 20 (S109). At the end of drainage, the washing process is ended.

Returning to FIG. 8(a), the control part 701 executes a middle dewatering process (S12). The driving form of the driving part 30 is kept at the uniaxial driving form. The control part 701 enables the driving motor 100 to rotate in a single direction at high speed. The drum 22 and the rotating body 24 integrally rotate at a rotating speed through which centrifugal force applied to the washings in the drum 22 is much greater than gravity. Under the action of the centrifugal force, the washings are pressed at the inner circumferential surface of the drum 22 to dewater. After a preset dewatering time is passed, the control part 701 stops the driving motor 100. Thus, the middle dewatering process is ended.

Then, the control part 701 executes a rinsing process (S13). The driving form of the driving part 30 is kept at the uniaxial driving form. The control part 701 enables the driving motor 100 to rotate after supplying water into the outer drum 20 to a specified water level. The drum 22 and the rotating body 24 integrally rotate rightwards and leftwards at a rotating speed through which centrifugal force applied to the washings in the drum 22 is smaller than gravity. The washings are rinsed in such a manner that the washings are turned by baffles 23 in the drum 22 and thrown to the inner circumferential surface of the drum 22. After a preset rinsing time is passed, the control part 701 stops the driving motor 100. Thus, the rinsing process is ended.

It should be noted that in order to inhibit increase of power consumption, the water in the outer drum 20 is not heated through the heater 60 during the rinsing process. However, under a condition of giving priority to enhancement of rinsing performance caused by warm water, the water in the outer drum 20 can also be heated during the rinsing process.

When the rinsing process is ended, the control part 701 executes a final dewatering process (S14). Although the final dewatering process is identical with the middle dewatering process, a dewatering time is set to be longer than the middle dewatering process. It should be noted that the middle dewatering process (S12) and the rinsing process (S13) can be performed more than two times prior to the final dewatering process.

When the final dewatering process is ended, the washing operation of the first washing mode is ended.

Figure 9:
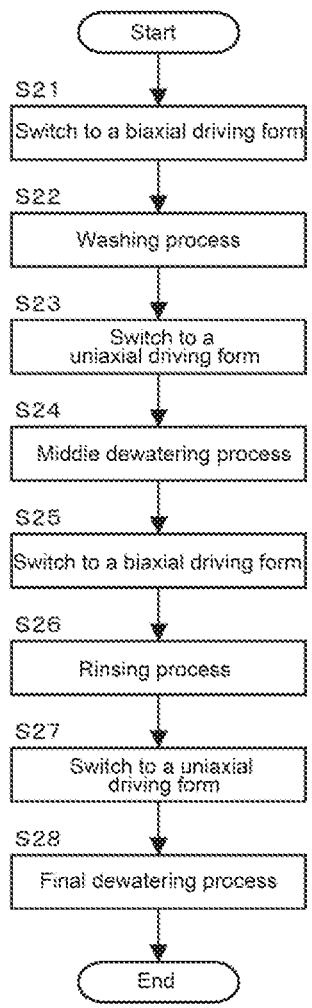
FIG. 9 is a flow chart illustrating control treatment of washing operation of a second washing mode in embodiments, and a flow chart illustrating control treatment of a washing process included in washing operation.
Figure 9:
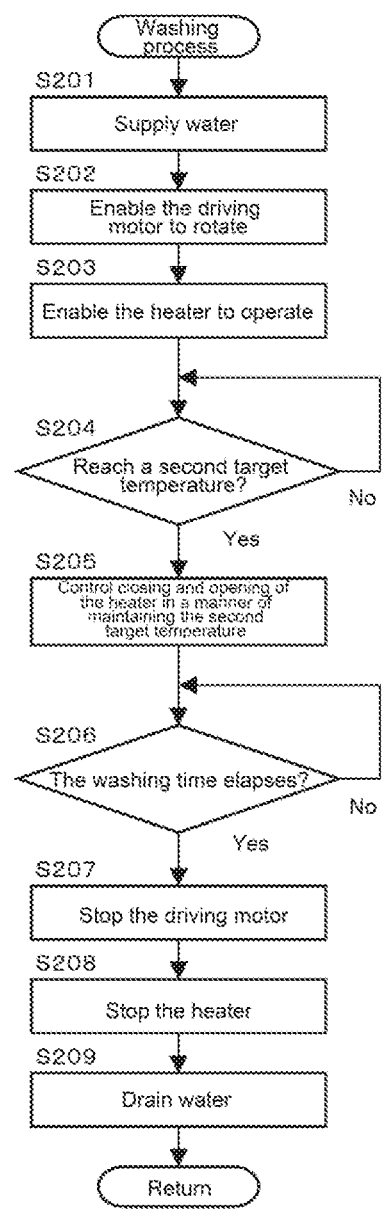

Then, the washing operation of the second washing mode is described. FIG. 9(a) is a flow chart illustrating control treatment of washing operation of the second washing mode. FIG. 9(b) is a flow chart illustrating control treatment of a washing process included in the washing operation.

When the start button 703b is pressed after the second washing mode is selected through the mode selection button 703c, the washing operation of the second washing mode is started.

With reference to FIG. 9(a), when the washing operation is started, the control part 701 enables the clutch mechanism part 600 to operate, and switches the driving form of the driving part 30 from the uniaxial driving form to the biaxial driving form (S21). Then, the control part 701 executes the washing process (S22).

With reference to FIG. 9(b), like the first washing mode, the control part 701 enables the driving motor 100 to rotate (S202) after supplying water into the outer drum 20 so that the detergent-containing water is accumulated to a specified water level (S201). Since the driving form is switched to the biaxial driving form, the drum 22 and the rotating body 24 rotate rightwards and leftwards respectively at a rotating speed through which centrifugal force applied to the washings in the drum 22 is smaller than gravity and the rotating body 24 rotates at a rotating speed higher than that of the drum 22.

Further, the control part 701 judges whether the water temperature in the outer drum 20 reaches the second target temperature (S204) after enabling the heater 60 to operate (S203). The second target temperature is a temperature lower than the first target temperature, and can be set as, for example, a temperature of about 30□ easy for sebum dirt to drop. When the water temperature in the outer drum 20 reaches the second target temperature (S204: yes), the control part 701 controls closing and opening of the heater 60 in such a manner that the water temperature in the outer drum 20 is kept at the second target temperature (S205).

The washings in the drum 22 are washed in such a manner that the washings are turned by baffles 23 and thrown to the inner circumferential surface of the drum 22. In addition, at the rear part of the drum 22, the washings are contacted with the protruding part 24a of the rotating body 24 which rotates relative to the drum 22, and is rubbed or stirred by the protruding part 24a. Besides the mechanical force produced by rotation of the rotating body 22, mechanical force produced by the rotating body 24 is also applied to the washings, so that the washings can be reliably washed.

In this way, since great mechanical force is applied to the washings, even if the water temperature in the outer drum 20 is not so high, good washing performance can be obtained. Therefore, in the second washing mode, the target water temperature is reduced and the heat produced by the heater 60 is inhibited to be low. Thus, the power consumption required for washing operation can be inhibited.

When the preset washing time is passed (S206: yes), the control part 701 stops the driving motor 100 (S207) and stops the heater 60 (S208). The control part 701 opens the drainage valve 40 to drain water from the outer drum 20 (S209). At the end of drainage, the washing process is ended.

Returning to FIG. 9(a), the control part 701 executes the middle dewatering process (S24) after the driving form of the driving part 30 is switched from the biaxial driving form to the uniaxial driving form (S23). The middle dewatering process is identical with the middle dewatering process of the first washing mode.

When the middle dewatering process is ended, the control part 701 executes the rinsing process (S26) after the driving form of the driving part 30 is switched from the uniaxial driving form to the biaxial driving form (S25). The control part 701 enables the driving motor 100 to rotate after supplying water into the outer drum 20 to a specified water level. The drum 22 and the rotating body 24 rotate rightwards and leftwards respectively at a rotating speed through which centrifugal force applied to the washings in the drum 22 is smaller than gravity and the rotating body 24 rotates at a rotating speed higher than that of the drum 22. The washings are rinsed in such a manner that the washings are turned by baffles 23 in the drum 22 and stirred by the rotating body 24. After a preset rinsing time is passed, the control part 701 stops the driving motor 100. Thus, the rinsing process is ended.

It should be noted that like the first washing mode, the water in the outer drum 20 is not heated through the heater 60 during the rinsing process. However, under a condition that the water in the outer drum 20 is heated in the rinsing process of the first washing mode, the water in the outer drum 20 can also be heated in the second washing mode. In this case, like the washing process, the target temperature in the second washing mode may be set to be lower than the target temperature in the first washing mode.

When the rinsing process is ended, the control part 701 executes the final dewatering process (S28) after the driving form of the driving part 30 is switched from the biaxial driving form to the uniaxial driving form (S27). The final dewatering process is identical with the final dewatering process of the first washing mode. It should be noted that the middle dewatering process (S24) and the rinsing process (S26) can be performed more than two times prior to the final dewatering process.

When the final dewatering process is ended, the washing operation of the second washing mode is ended.

Effects of Embodiments

According to the present embodiment, the drum washing machine includes a driving part 30, capable of switching the driving form between the biaxial driving form and the uniaxial driving form, wherein the biaxial driving form refers to a driving form that enables the drum 22 and the rotating body 24 to respectively rotate in such a manner that the rotating body 24 rotates at a rotating speed higher than that of the drum 22, and the uniaxial driving form refers to a driving form that enables the drum 22 and the rotating body 24 to integrally rotate in such a manner that the drum 22 and the rotating body 24 rotate at the same rotating speed. Further, the washing operation of the first washing mode and the washing operation of the second washing mode are executed, wherein the washing operation of the first washing mode refers to heating the detergent-containing water in the outer drum 20 with the heater 60 to the first target temperature and enabling the drum 22 and the rotating body 24 to rotate in the uniaxial driving form during the washing process; and the washing operation of the second washing mode refers to heating the detergent-containing water in the outer drum 20 with the heater 60 to the second target temperature lower than the first target temperature and enabling the drum 22 and the rotating body 24 to rotate in the biaxial driving form during the washing process.

Thus, in the first washing mode, since mechanical force produced by the rotating body 24 is not applied, even if the washings cannot bear mechanical force, cloth can be prevented from being damaged; and moreover, since the water temperature in the outer drum 20 is increased, capability of detergents can be increased so as to well wash the washings. Further, in the second washing mode, since the mechanical force produced by rotation of the rotating body 24 can be applied to the washings besides the mechanical force produced by rotation of the drum 22, the washings can be reliably washed; and moreover, since the heat is inhibited compared with the first washing mode even if the water in the outer drum 20 is heated, the power consumption required for washing operation can be inhibited.

Further, in the present embodiment, the first washing mode and the second washing mode control the heater 60 in such a manner that the water temperature in the outer drum 20 is also kept at the target temperature after reaching the target temperature. Thus, in the washing process, an effect caused by warm water can be kept for long.

Although embodiments regarding the present disclosure are described above, the present disclosure is not limited to the above-mentioned embodiments. In addition, various changes except for the above can also be made to embodiments of the present disclosure.

Change Embodiment I

Figure 10:
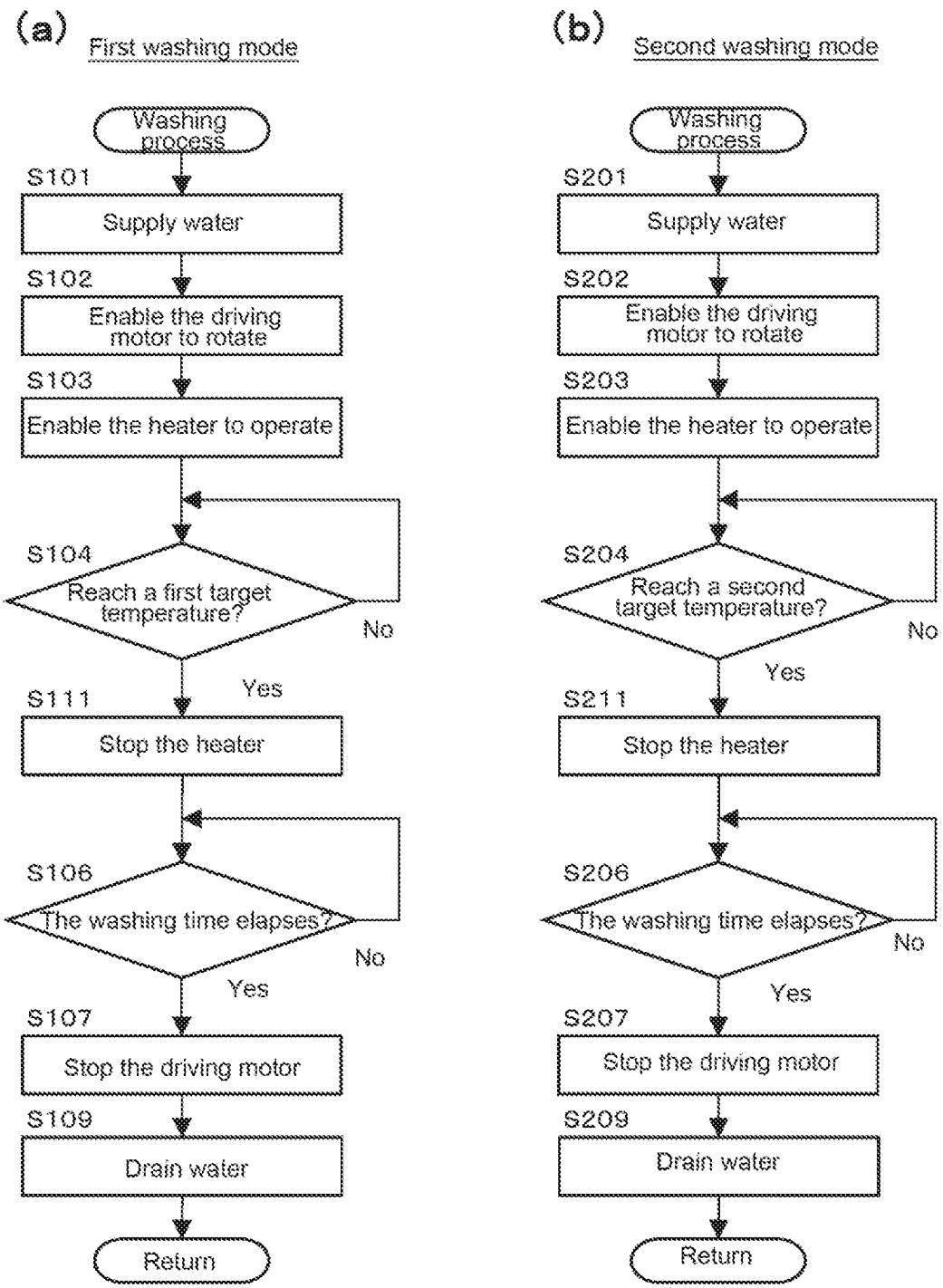
FIG. 10 is a flow chart illustrating control treatment of a washing process of a first washing mode in a change embodiment I, and a flow chart illustrating control treatment of a washing process of a second washing mode.

FIG. 10(*a*) is a flow chart illustrating control treatment of a washing process of a first washing mode in a change embodiment I. FIG. 10(*b*) is a flow chart illustrating control treatment of a washing process of a second washing mode in a change embodiment I.

In the flow chart of FIG. 10(*a*), relative to the flow chart of FIG. 8(*b*), treatment of step S105 is replaced with treatment of step S111, and treatment of step S108 is deleted. In addition, in the flow chart of FIG. 10(*b*), relative to the flow chart of FIG. 9(*b*), treatment of step S205 is replaced with treatment of step S211, and treatment of step S208 is deleted.

Namely, in the above embodiment, in the washing process of the first washing mode, closing and the opening of the heater 60 are controlled in such a manner that the water temperature in the outer drum 20 is kept at the first target temperature after reaching the first target temperature. In contrast, in the present change embodiment, as shown in FIG. 10(*a*), when the water temperature in the outer drum 20 reaches the first target temperature (S104: yes), the control part 701 stops the heater 60 (S111). When the washing time is passed (S106: yes), since the heater 60 is stopped, the control part 701 only stops the driving motor 100 in step S107.

Similarly, in the above embodiment, in the washing process of the second washing mode, closing and the opening of the heater 60 are controlled in such a manner that the water temperature in the outer drum 20 is kept at the second target temperature after reaching the second target temperature. In contrast, in the present change embodiment, as shown in FIG. 10(*b*), when the water temperature in the outer drum 20 reaches the second target temperature (S204: yes), the control part 701 stops the heater 60 (S211). When the washing time is passed (S206: yes), since the heater 60 is stopped, the control part 701 only stops the driving motor 100 in step S207.

Through the structure in the present change embodiment, since the heater 60 is stopped after the water temperature in the outer drum 20 reaches the first target temperature and the second target temperature in the first washing mode and the second washing mode, the power consumption can be inhibited compared with a structure of keeping the target temperature.

Change Embodiment II

Figure 11:
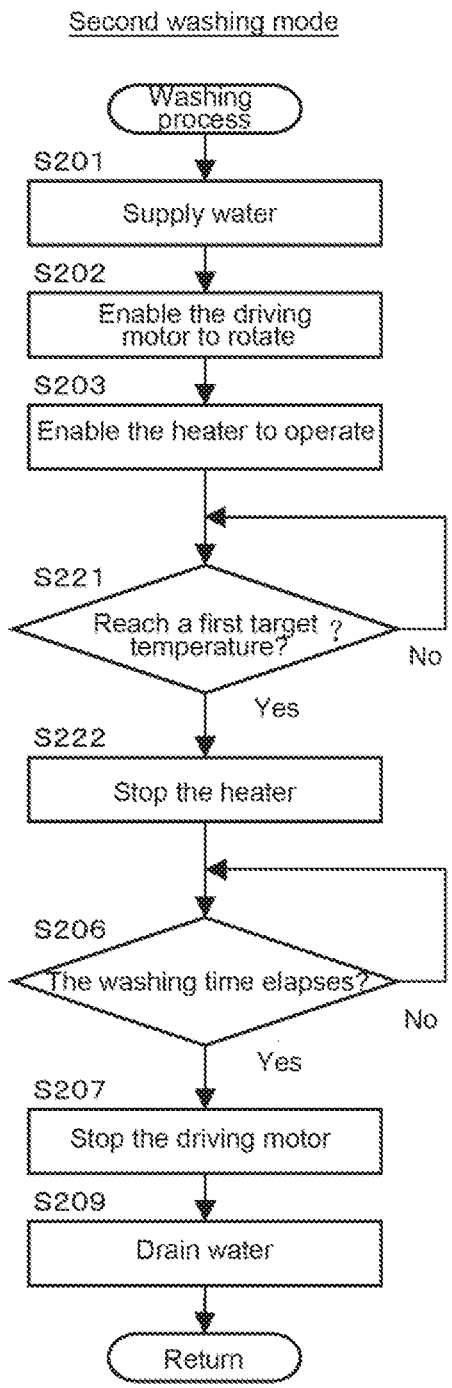
FIG. 11 is a flow chart illustrating control treatment of a washing process of a second washing mode in a change embodiment II.

FIG. 11 is a flow chart illustrating control treatment of a washing process of a second washing mode in a change embodiment II. In the flow chart of FIG. 11, relative to the flow chart of FIG. 9(b), treatments of step S204 and step S205 are replaced with treatments of step S221 and step S222, and treatment of step S208 is deleted.

Namely, in the above embodiment, in the washing process of the second washing mode, closing and the opening of the heater 60 are controlled in such a manner that the water temperature in the outer drum 20 is kept at the second target temperature after reaching the second target temperature. In contrast, in the present change embodiment, the target temperature is set as the first target temperature identical with the first washing mode. Moreover, as shown in FIG. 11, when the water temperature in the outer drum 20 reaches the first target temperature (S221: yes), the control part 701 stops the heater 60 (S222). When the washing time is passed (S206: yes), since the heater 60 is stopped, the control part 701 only stops the driving motor 100 in step S207.

In the present change embodiment, the washing process of the first washing mode is identical with that in the above embodiment. Namely, closing and the opening of the heater 60 are controlled in such a manner that the water temperature in the outer drum 20 is kept at the first target temperature after reaching the first target temperature. As mentioned above, in the second washing mode, the heater 60 is stopped after the water temperature in the outer drum 20 reaches the first target temperature. Therefore, since the heat produced by the heater 60 is reduced compared with the first washing mode, the power consumption can be inhibited.

Through the structure in the present change embodiment, in the second washing mode, since the water temperature in the outer drum 20 is briefly increased to the same first target temperature as the first washing mode, an effect of warm water at the first target temperature can be obtained within a period of time.

Change Embodiment III

Figure 12:
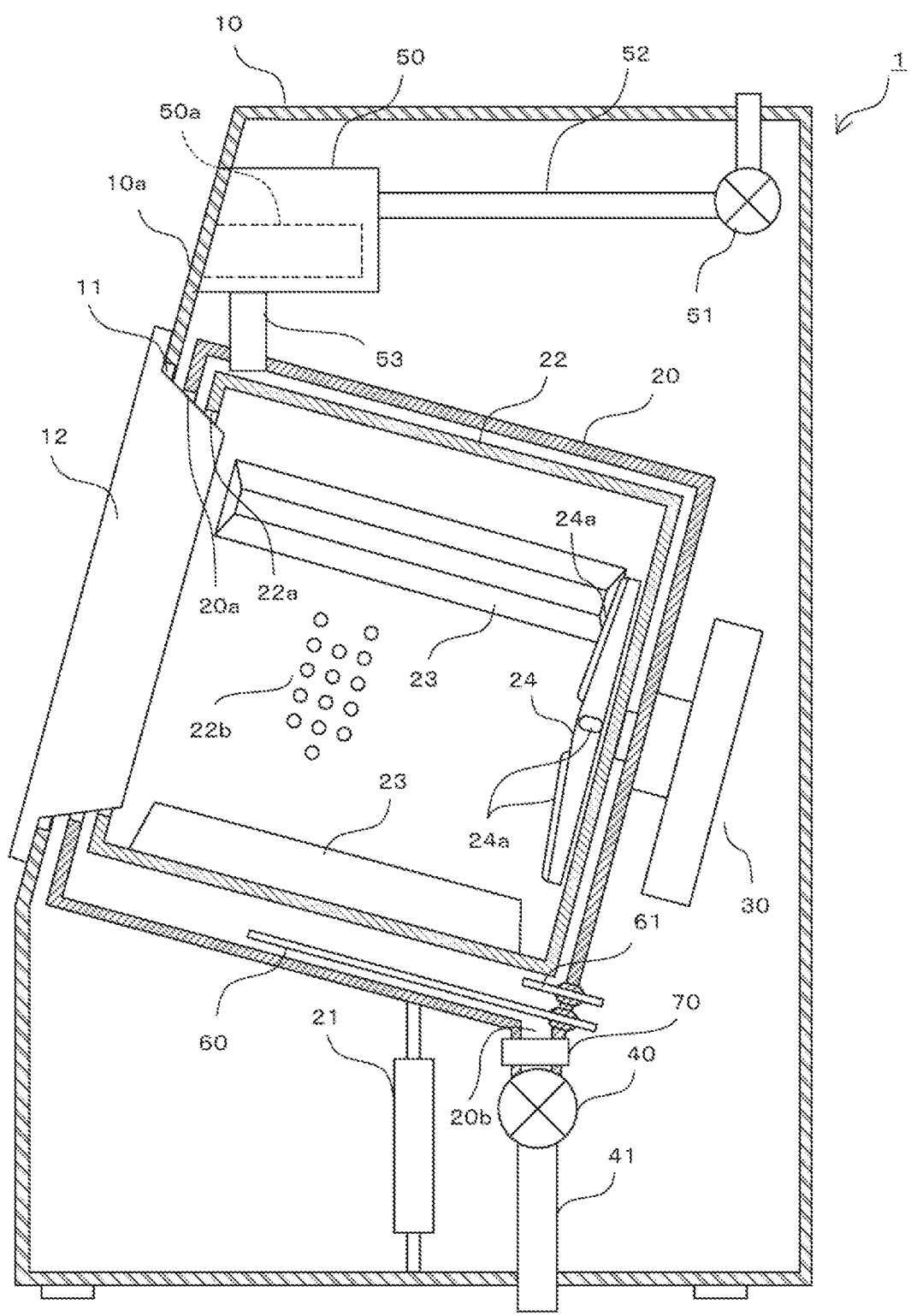
FIG. 12 is a side sectional view illustrating a structure of a drum washing machine in a change embodiment III.
Figure 13:
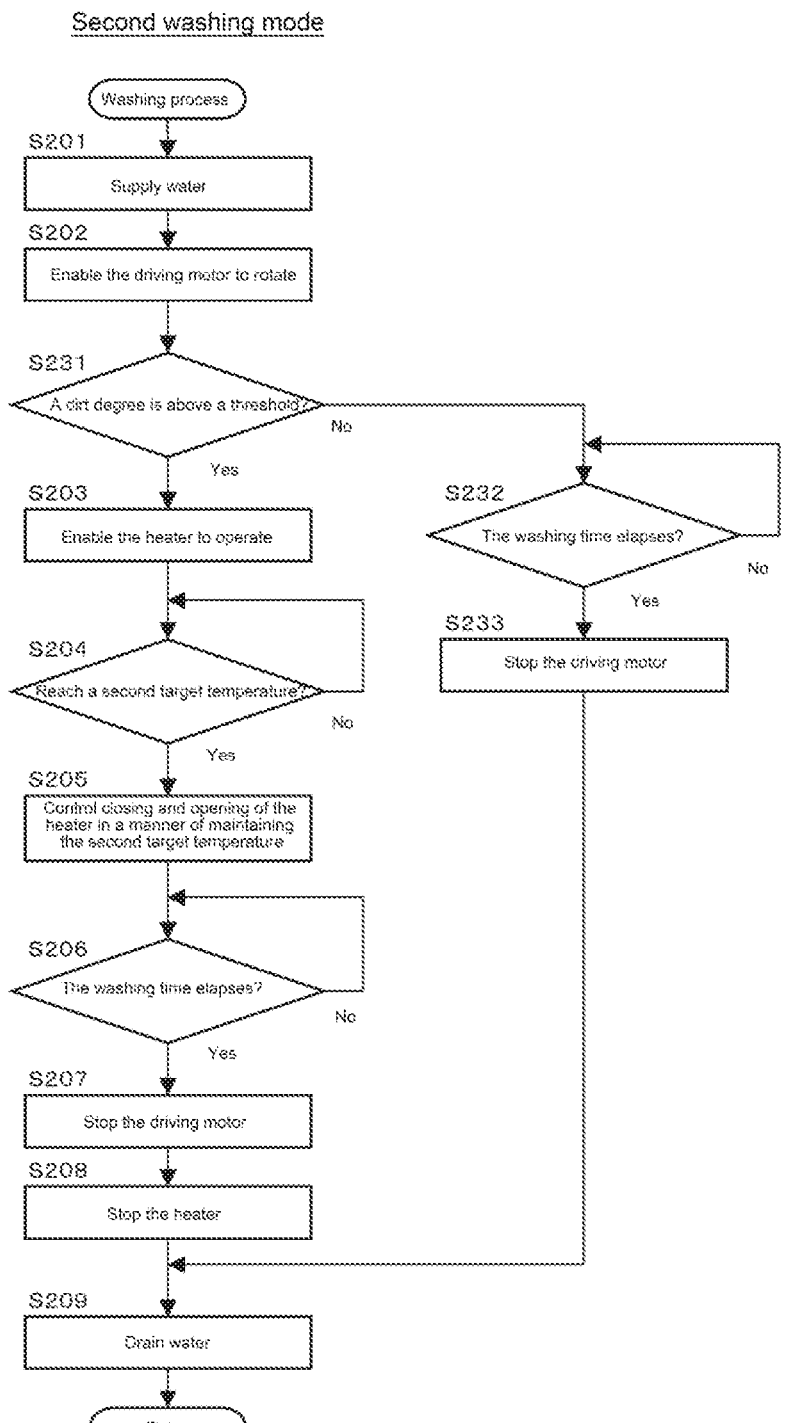
FIG. 13 is a flow chart illustrating control treatment of a washing process of a second washing mode in the change embodiment III.

FIG. 12 is a structural side sectional view illustrating a drum washing machine 1 in a change embodiment III. FIG. 13 is a flow chart illustrating control treatment of a washing process of a second washing mode in a change embodiment III.

As shown in FIG. 12, in the present change embodiment, a dirt sensor 70 is configured in the water outlet part 20b of the outer drum 20. As a dirt sensor 70, for example, a type of sensor having a pair of electrodes and configured to detect a dirt degree of water based on a water conductivity between the electrodes, a type of sensor having a light-emitting element and a light-acceptance element and configured to detect a dirt degree of water based on a water transparence between the elements, or a type of sensor having a pair of electrodes, a light-emitting element and a light-acceptance element can be listed.

In the flow chart of FIG. 13, relative to the flow chart of FIG. 9(b), treatments of step S231 to step S233 are added. Namely, in the washing process of the second washing mode, the control part 701 judges the dirt degree of the washings (S231) according to a detection signal output by the dirt sensor 70 after enabling the driving motor 100 to rotate in step S202. Under a condition that the dirt degree is greater than the specified threshold (S231: yes), the control part 701 enables the heater 60 to operate (S203). Then, treatments from step S204 to step S208 are performed.

On the other hand, under a condition that the dirt degree is smaller than the threshold (S231: no), the control part 701 does not enable the heater 60 to operate. Then, when the washing time is passed (S232: yes), the control part 701 stops the driving motor 100 (S233) and moves to step S209 for drainage.

It should be noted that in the present change embodiment, the first washing mode is identical with that in the above embodiment.

Through the structure in the present change embodiment, a drum washing machine can be realized. In the washing process of the second washing mode, since the heater 60 is not operated under the condition that the dirt degree of the washings is small, the power consumption can be further reduced.

It should be noted that the structure in the present change embodiment can also be applicable to any one of change embodiments 1 to 3.

Change Embodiment IV

Figure 14:
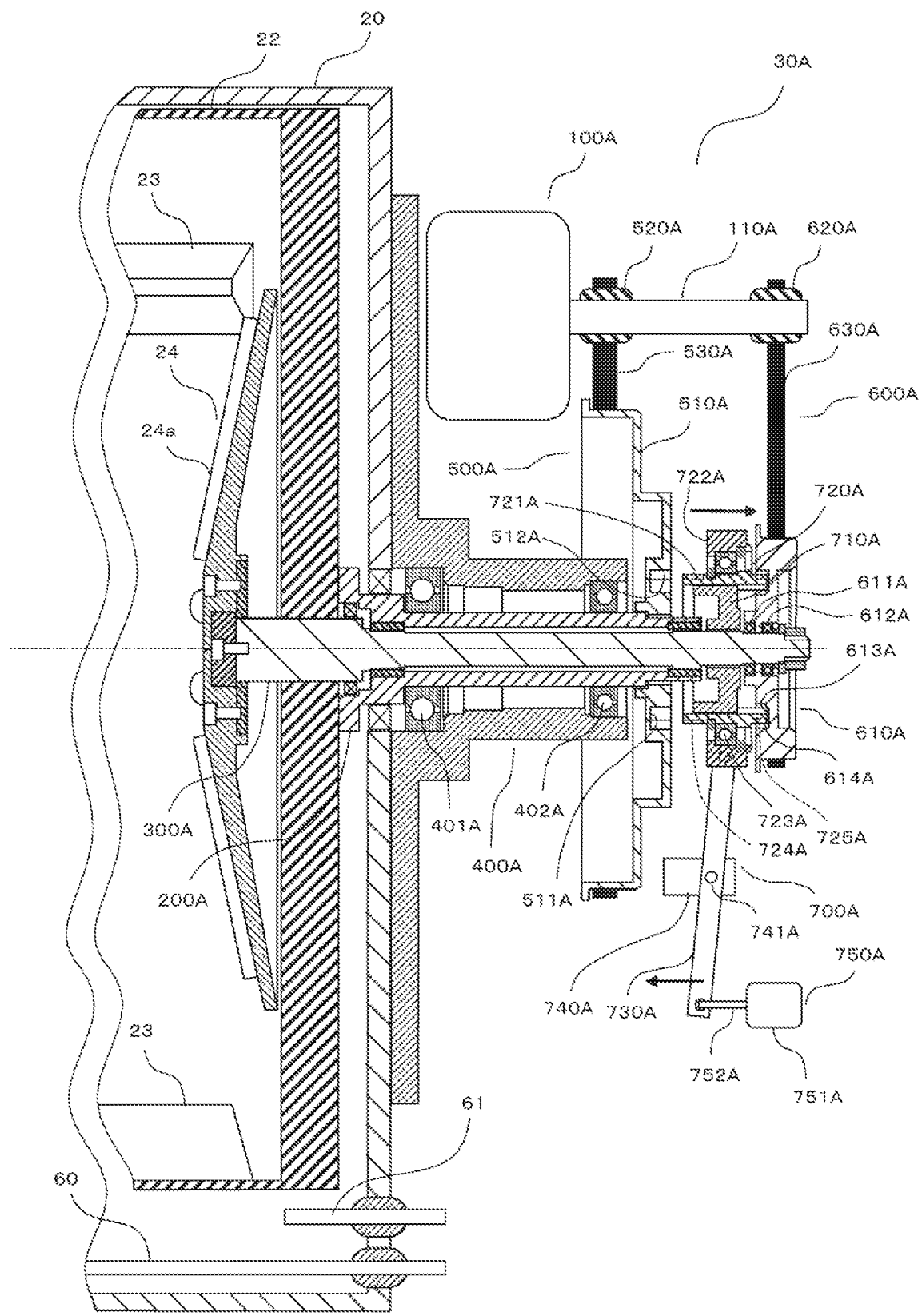
FIG. 14 is a sectional view illustrating a structure of a driving part in a change embodiment IV.
Figure 15:
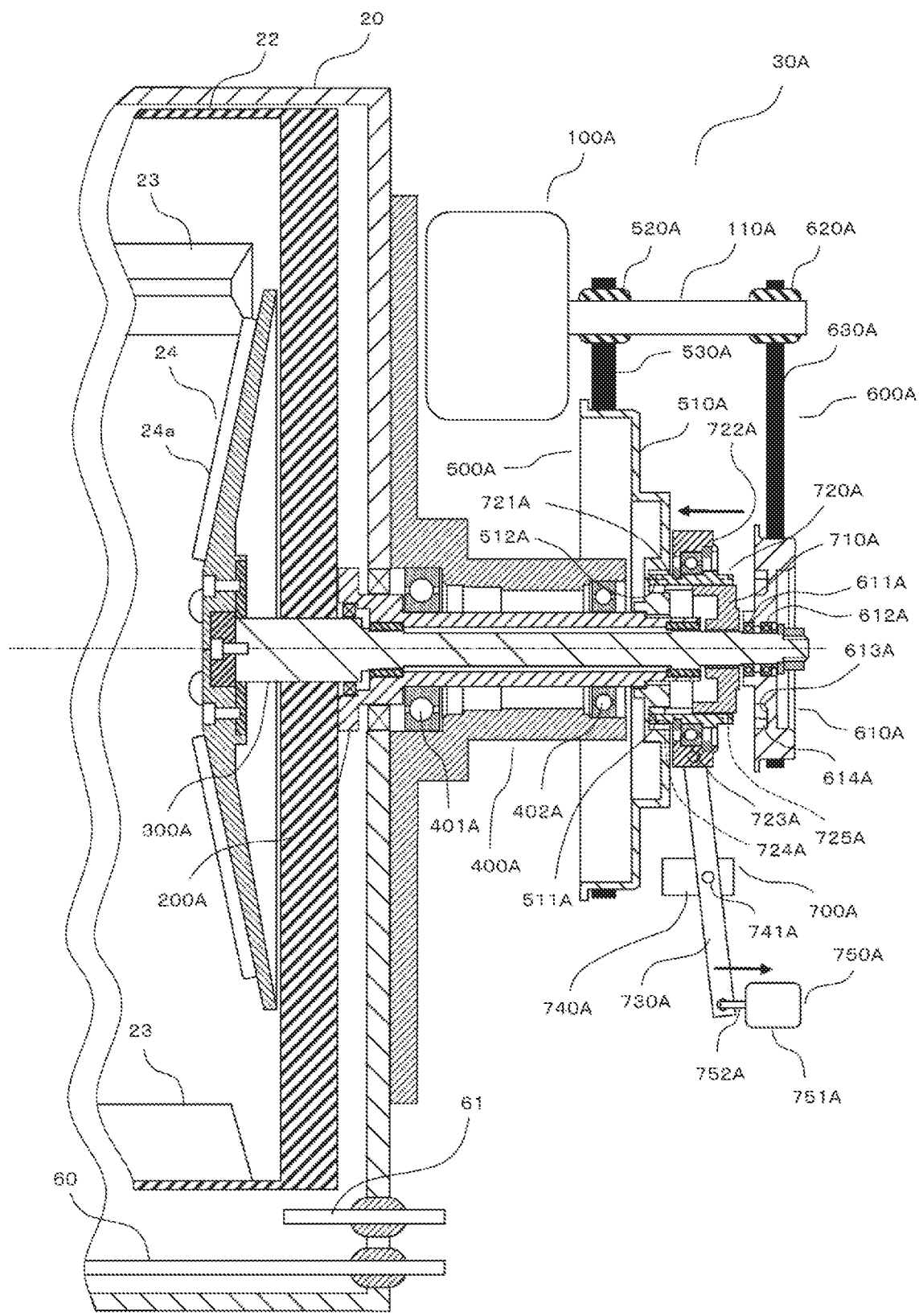
FIG. 15 is a sectional view illustrating a structure of a driving part in the change embodiment IV.

FIG. 14 and FIG. 15 are sectional views illustrating a structure of a driving part 30A in a change embodiment IV. FIG. 14 shows a state of switching a driving form of the driving part 30A to a biaxial driving form. FIG. 15 shows a state of switching a driving form of the driving part 30A to a uniaxial driving form.

In the above embodiment, relative to realization of a structure of generating a speed difference between the drum 22 and the rotating body 24 by using the planetary gear mechanism 400, a structure of generating a speed difference between the drum 22 and the rotating body 24 is realized by using a speed reducing mechanism composed of a transmission belt and a belt wheel in the present change embodiment. A structure of the driving part 30A in thepresent change embodiment is described below in detail.

The driving part 30A includes: a driving motor 100A, a first rotating shaft 200A, a second rotating shaft 300A, a bearing unit 400A, a drum speed reducing mechanism part 500A, a wing speed reducing mechanism part 600A and a clutch mechanism part 700A.

The driving motor 100A is, for example, an internal rotor type DC brushless motor and generates torques for driving the drum 22 and the rotating body 24. A motor shaft 110A of the driving motor 100A extends backwards.

The first rotating shaft 200A is of a hollow shape and rotatably encircles the second rotating shaft 300A. A front of the second rotating shaft 300A is protruded forwards from the first rotating shaft 200A, and a rear part of the second rotating shaft 300A is protruded backwards from the first rotating shaft 200A. The drum 22 is fixed to the first rotating shaft 200A, and the rotating body 24 is fixed to the second rotating shaft 300A.

The bearing unit 400A is fixed to a rear surface of the outer drum 20. The bearing unit 400A rotatably supports the first rotating shaft 200A through two bearings 401A and 402A arranged in the bearing unit 400A.

The drum speed reducing mechanism part 500A includes a first belt wheel 510A, a first motor belt wheel 520A and a first transmission belt 530A, and decelerates and transmits rotation of the driving motor 100A to the first rotating shaft 200A.

The first belt wheel 510A is fixed to a rear end part of the first rotating shaft 200A. An annular engaged recess part 511A is formed on a rear surface of the first belt wheel 510A. Splines 512A are formed on the outer circumferential surface in the engaged recess part 511A throughout the entire circumference.

The first motor belt wheel 520A is installed on a root of the motor shaft 110A of the driving motor 100A. The first transmission belt 530A is erected between the first belt wheel 510A and the first motor belt wheel 520A.

The wing speed reducing mechanism part 600A includes a second belt wheel 610A, a second motor belt wheel 620A and a second transmission belt 630A, and decelerates and transmits rotation of the driving motor 100A to the second rotating shaft 300A.

The second belt wheel 610A is connected with the second rotating shaft 300A through two bearings 611A and 612A, and is supported on the second rotating shaft 300A in a free rotation manner. An annular engaged recess part 613A is formed on a front surface of the second belt wheel 610A. Splines 614A are formed on the outer circumferential surface in the engaged recess part 613A throughout the entire circumference.

The second motor belt wheel 620A is installed on a top end part of the motor shaft 110A of the driving motor 100A. The second transmission belt 630A is erected between the second belt wheel 610A and the second motor belt wheel 620A.

Since an outside diameter of the first motor belt wheel 520A is equal to an outside diameter of the second motor belt wheel 620A and an outside diameter of the second belt wheel 610A is smaller than an outside diameter of the first belt wheel 510A, a speed reducing ratio of the wing speed reducing mechanism part 600A is smaller than a speed reducing ratio of the drum speed reducing mechanism part 500A.

The clutch mechanism part 700A switches a driving form of the driving part 30A between the biaxial driving form and the uniaxial driving form, wherein the biaxial driving form refers to a driving form that connects the second rotating shaft 300A with the second belt wheel 610A in such a manner that rotation of the second belt wheel 610A can be transmitted to the second rotating shaft 300A and that enables the rotating body 24 to rotate at a rotating speed higher than that of the drum 22, and the uniaxial driving form refers to a driving form that connects the second rotating shaft 300A with the first belt wheel 510A in such a manner that rotation of the first belt wheel 510A can be transmitted to the second rotating shaft 300A and that enables the drum 22 and the rotating body 24 to rotate at a same rotating speed.

The clutch mechanism part 700A includes: a clutch guide 710A, a clutch body 720A, a clutch lever 730A, a lever supporting part 740A and a clutch driving apparatus 750A.

The clutch guide 710A and the clutch body 720A are configured between the first belt wheel 510A and the second belt wheel 610A. The clutch guide 710A is of a cylindrical shape with an opened front surface, and is fixed to the second rotating shaft 300A in a manner of being unmovable in an axial direction and a circumferential direction of the second rotating shaft 300A.

The clutch body 720A includes a clutch part 721A, an encircling part 722A and a bearing 723A. The clutch part 721A is of a cylindrical shape with an opened front surface and an opened rear surface. Front splines 724A and rear splines 725A are respectively formed on the outer circumferential surface of the clutch part 721A at the front part and the rear part throughout the entire circumference.

The clutch guide 710A is inserted into the interior of the clutch part 721A. The inner circumferential surface of the clutch part 721A is combined with the outer circumferential surface of the clutch guide 710A through the splines. The clutch part 721A can move to the axial direction of the second rotating shaft 300A relative to the clutch guide 710A, i.e., the second rotating shaft 300A fixed with the clutch guide 710A, but cannot rotate.

The encircling part 722A is formed in an annular shape and encircles the central part of the clutch part 721A in such a manner that the clutch part 721A freely rotates. The bearing 723A is arranged between the clutch part 721A and the encircling part 722A in such a manner that the clutch part 721A successfully rotates relative to the encircling part 722A.

An upper end part of the clutch lever 730A is connected with the encircling part 722A in a rotatable manner relative to the encircling part 722A. In addition, the clutch lever 730A is supported by a supporting shaft 741A arranged on the lever supporting part 740A in a free rotation manner.

The clutch driving apparatus 750A includes an actuator 751A and an operation lever 752A. The actuator 751A enables the operation lever 752A to move forward and backward. The operation lever 752A is connected with the lower end part of the clutch lever 730A. The lower end part of the clutch lever 730A can rotate relative to the operation lever 752A.

Under a condition that the driving form of the driving part 30A is switched from the uniaxial driving form to the biaxial driving form, as shown in FIG. 14, the operation lever 752A is pushed forward from the interior of an actuator 751A. The lower end part of the clutch lever 730A is pushed by the operation lever 752A to move forward. The clutch lever 730A rotates backwards by using the supporting shaft 741A as the center. The upper end part of the clutch lever 730A moves backwards. The clutch body 720A is pushed by the upper end part of the clutch lever 730A to move backwards. Thus, the rear splines 725A of the clutch part 721A are engaged with the splines 614A of the second belt wheel 610A.

When the rear splines 725A and the splines 614A are engaged, since the clutch part 721A and the second belt wheel 610A are fixed in a rotation direction, a state in which the rotation of the second belt wheel 610A is transmitted to the second rotating shaft 300A by the clutch part 721A and the clutch guide 710A is formed. In this state, when the driving motor 100A rotates, the rotation is transmitted to the second rotating shaft 300A by the wing speed reducing mechanism part 600A, and the rotating body 24 fixed to the second rotating shaft 300A rotates. The rotating body 24 rotates at the rotating speed after the rotating speed of the driving motor 100A is reduced according to the speed reducing ratio of the wing speed reducing mechanism part 600A. In addition, the rotation of the driving motor 100A is transmitted to the first rotating shaft 200A by the drum speed reducing mechanism part 500A, and the drum 22 fixed to the first rotating shaft 200A rotates. The drum 22 rotates at the rotating speed after the rotating speed of the driving motor 100A is reduced according to the speed reducing ratio of the drum speed reducing mechanism part 500A. As mentioned above, since the speed reducing ratio of the wing speed reducing mechanism part 600A is smaller than the speed reducing ratio of the drum speed reducing mechanism part 500A, the rotating body 24 rotates at the rotating speed higher than that of the drum 22 in the same direction as that of the drum 22.

It should be noted that since the clutch lever 730A is connected with the encircling part 722A connected with the clutch part 721A in a free rotation state, even if the clutch part 721A rotates, the torque produced by the rotation is not substantially transmitted to the clutch lever 730A.

On the other hand, under a condition that the driving form of the driving part 30A is switched from the biaxial driving form to the uniaxial driving form, as shown in FIG. 15, the operation lever 752A is pulled into the actuator 751A. Namely, the operation lever 752A moves backwards. The lower end part of the clutch lever 730A is pulled by the operation lever 752A to move backwards. The clutch lever 730A rotates forward by using the supporting shaft 741A as the center. The upper end part of the clutch lever 730A moves forwards. The clutch body 720A is pushed by the upper end part of the clutch lever 730A to move forwards. Thus, the front splines 724A of the clutch part 721A are engaged with the splines 512A of the first belt wheel 510A.

When the spline 724A and the spline 512A are engaged currently, since the clutch part 721A and the first belt wheel 510A are fixed in a rotation direction, a state in which the rotation of the first belt wheel 510A is transmitted to the second rotating shaft 300A by the clutch part 721A and the clutch guide 710A is formed. In this state, when the driving motor 100A rotates, the rotation is transmitted to the first rotating shaft 200A and the second rotating shaft 300A by the drum speed reducing mechanism part 500A, and the drum 22 and the rotating body 24 rotate. The drum 22 and the rotating body 24 integrally rotate in the same direction at the rotating speed after the rotating speed of the driving motor 100A is reduced according to the speed reducing ratio of the drum speed reducing mechanism part 500A.

It should be noted that in the uniaxial driving form, when the driving motor 100A rotates, the second belt wheel 610A also rotates with the rotation. However, the second belt wheel 610A only idles relative to the second rotating shaft 300A, and the rotation of the second belt wheel 610A is not transmitted to the second rotating shaft 300A.

Change Embodiment V

Figure 16:
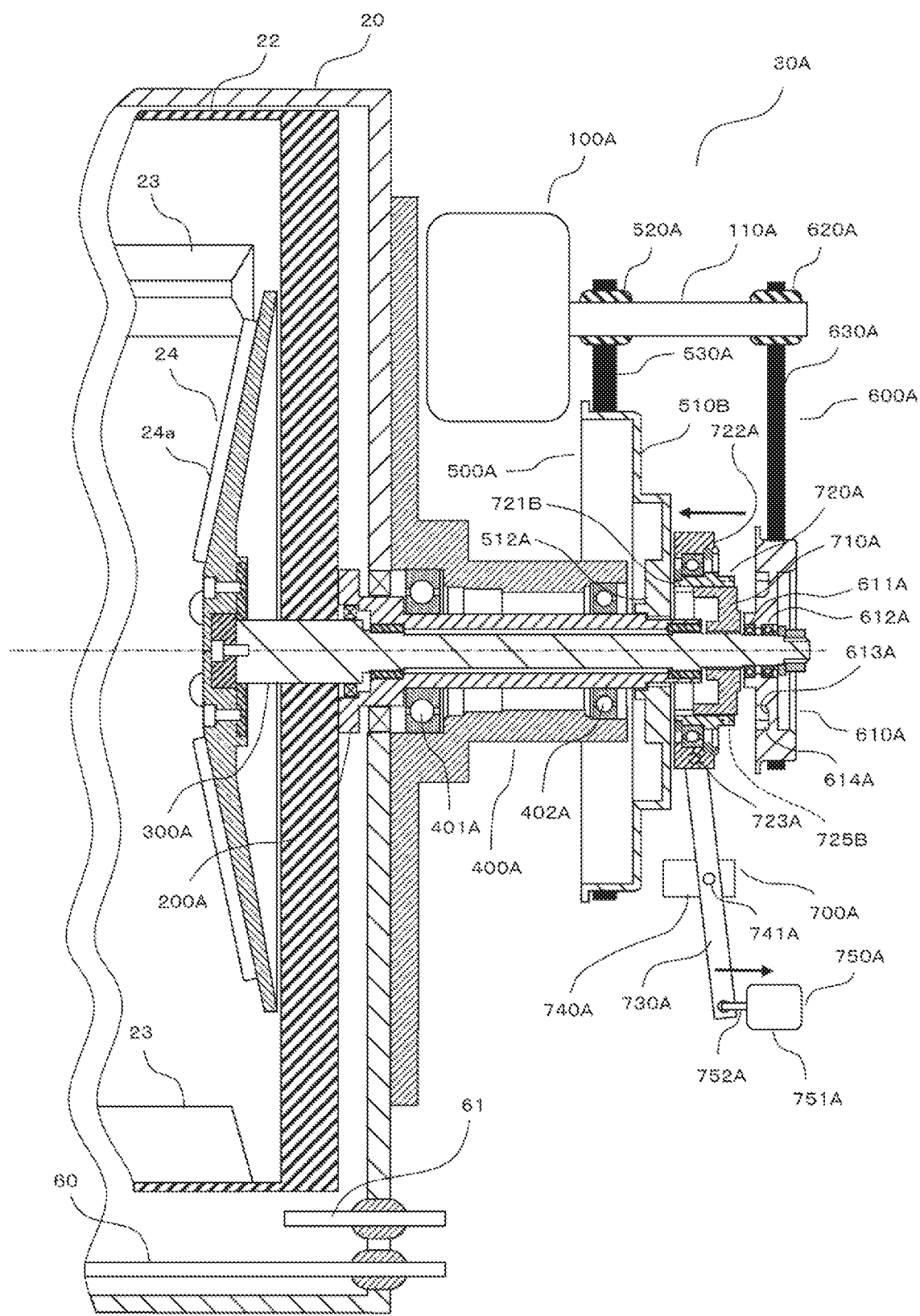
FIG. 16 is a sectional view illustrating a structure of a driving part in a change embodiment V.

FIG. 16 is a sectional view illustrating a structure of a driving part 30A in a change embodiment V. In the driving part 30A in the present change embodiment, the first belt wheel 510A of the drum speed reducing mechanism part 500A is changed to the first belt wheel 510B, and the clutch part 721A of the clutch mechanism part 700A is changed to the clutch part 721B. The driving part 30A switches a driving form between the biaxial driving form and the drum uniaxial driving form through the clutch mechanism part 700A. In the drum uniaxial driving form, a state in which the rotation of the driving motor 100A is transmitted to the drum 22 but not transmitted to the rotating body 24, and the drum 22 rotates but the rotating body 24 can freely rotate relative to the drum 22 is formed. It should be noted that the drum uniaxial driving form is equivalent to the first driving form of the present disclosure.

Specifically, as shown in FIG. 16, the first belt wheel 510B is not provided with the engaged recess part 511A and the spline 512A arranged on the first belt wheel 510A. In addition, the clutch part 721B is provided with a rear spline 725B, but is not provided with a front spline 724A arranged on the clutch part 721A. In the drum uniaxial driving form, the clutch body 720A moves forwards, the rear spline 725B is disengaged from the spline 614A, and the second rotating shaft 300A is in a state of not connecting with the first belt wheel 510B and the second belt wheel 610A. In this state, when the driving motor 100A rotates, although the drum 22 rotates, the rotations of the belt wheels 510B and 610A are not transmitted to the second rotating shaft 300A. Therefore, the rotating body 24 does not rotate. However, since the second rotating shaft 300A can rotate relative to the first rotating shaft 200A, the rotating body 24 is in a state of free rotation.

In this way, under a condition of adopting a structure of switching the driving form of the driving part 30A between the biaxial driving form and the drum uniaxial driving form, in the first washing mode, in the washing process and the rinsing process, the driving part 30A is driven at the drum uniaxial driving form. The driving form of the driving part 30 before the washing operation is started is set as the drum uniaxial driving form. From the beginning to the end of the washing operation of the first washing mode, the driving form of the driving part 30A is kept at the drum uniaxial driving form.

In the second washing mode, treatments of steps S21 and S22 in FIG. 9(a) are changed to treatment of switching from the drum uniaxial driving form to the biaxial driving form, and treatments of steps S23 and S24 are changed to treatment of switching from the biaxial driving form to the drum uniaxial driving form.

Similar to the present change embodiment, under a condition of adopting a structure of switching the driving form of the driving part 30A between the biaxial driving form and the drum uniaxial driving form and driving the driving part 30A in the drum uniaxial driving form in the washing process and the rinsing process of the first washing mode, similarly, since the rotating body 24 is not rotated by the driving motor 100A in the drum uniaxial driving form, the washings are not actively rubbed or stirred by the protruding part 24a of the rotating body 24 under rotation. Thus, damage to the washings can be prevented. Therefore, the washing operation of the first washing mode and the washing operation of the second washing mode can also be executed through the structure of the present change embodiment, a same action effect as the above embodiment can be performed.

Change Embodiment VI

Figure 17:
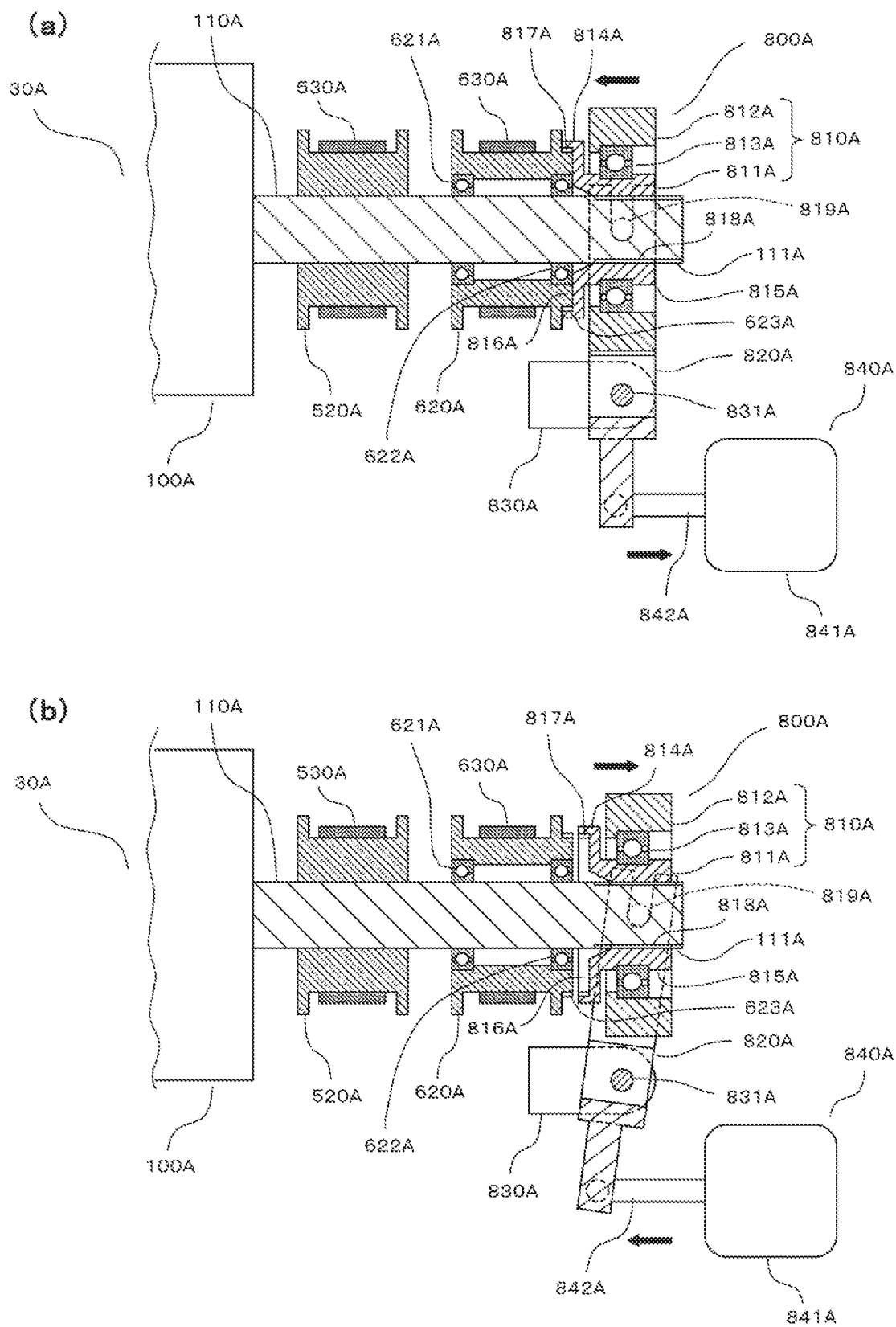
FIG. 17 is a sectional view illustrating a main part of a driving part of a structure of a clutch mechanism part in a change embodiment VI.

Similar to the change embodiment V, under a condition of adopting a structure of switching the driving form of the driving part 30A between the biaxial driving form and the drum uniaxial driving form, the clutch mechanism part 700A can be replaced and a structure in which the clutch mechanism part 800A is arranged on the side of the driving motor 100A is adopted as shown in FIG. 17. In this case, bearings 611A and 612A are not arranged on the second belt wheel 610A, and the second belt wheel 610A is fixed to the second rotating shaft 300A in an irrotational manner.

FIG. 17 is a sectional view illustrating a main part of a driving part 30A of a structure of a clutch mechanism part 800A in a change embodiment VI. FIG. 17(a) shows a state of switching a driving form of the driving part 30A to a biaxial driving form. FIG. 17(b) shows a state of switching a driving form of the driving part 30A to a drum biaxial driving form.

In the present change embodiment, the second motor belt wheel 620A is supported by the motor shaft 110A of the driving motor 100A in a free rotation manner. Namely, the second motor belt wheel 620A is installed in an approximately central part of the motor shaft 110A through a front bearing 621A and a rear bearing 622A. The second motor belt wheel 620A successfully rotates relative to the motor shaft 110A through the bearings 621A and 622A. On the second motor belt wheel 620A, splines 623A are formed throughout the entire circumference on the outer circumferential surface of the rear end part.

The clutch mechanism part 800A includes: a clutch body 810A, a clutch lever 820A, a lever supporting part 830A and a clutch driving apparatus 840A.

The clutch body 810A is configured at the rear part of the second motor belt wheel 620A of the motor shaft 110A, and includes a clutch part 811A, an encircling part 812A and a bearing 813A. The clutch part 811A is formed into a roughly cylindrical shape. An outside diameter of a front end part 814A of the clutch part 811A is greater than an outside diameter of a main body part 815A at the rear of the front end part 814A. At the front end part 814A, an engaging recess part 816A having an inside diameter approximately equal to the outside diameter of the rear end part of the second motor belt wheel 620A is formed. First splines 817A are formed on the inner circumferential surface in the engaging recess part 816A throughout the entire circumference. In addition, second splines 818A are formed on the inner circumferential surface in the main body part 815A throughout the entire circumference.

Splines 111A are formed throughout the entire circumference on the outer circumferential surface of the top end part of the motor shaft 110A. A front and rear dimension of the splines 111A is set to be greater than a front and rear dimension of the second splines 818A. The second splines 818A of the clutch part 811A are engaged with the splines 111A of the motor shaft 110A. Through the engagement, the clutch part 811A is in a state of moving to the axial direction of the motor shaft 110A relative to the motor shaft 110A and rotating together with the motor shaft 110A.

The encircling part 812A is formed in an annular shape and encircles the central part of the clutch part 811A in such a manner that the clutch part 811A freely rotates. The bearing 813A is clamped between the clutch part 811A and the encircling part 812A. The clutch part 811A successfully rotates relative to the encircling part 812A through the bearing 813A.

The clutch lever 820A has a roughly Y shape. An upper end part of the clutch lever 820A is rotatably connected with a shaft part 819A which is protruded to left and right of the encircling part 812A. In addition, the clutch lever 820A is supported by a supporting shaft 831A arranged on the lever supporting part 830A in a free rotation manner.

The clutch driving apparatus 840A includes an actuator 841A and an operation lever 842A. The actuator 841A enables the operation lever 842A to move forward and backward. The operation lever 842A is connected with the lower end part of the clutch lever 820A. The lower end part of the clutch lever 820A can rotate relative to the operation lever 842A.

Under a condition that the driving form of the driving part 30A is switched from the drum uniaxial driving form to the biaxial driving form, as shown in FIG. 17(a), the operation lever 842A is pulled into the actuator 841A. Namely, the operation lever 842A moves backwards. The lower end part of the clutch lever 820A is pulled by the operation lever 842A to move backwards. The clutch lever 820A rotates forward by using the supporting shaft 831A as the center. The upper end part of the clutch lever 820A moves forwards. The clutch body 810A is pushed by the upper end part of the clutch lever 820A to move forwards. Thus, the first splines 817A of the clutch part 811A are engaged with the splines 623A of the second motor belt wheel 620A. The motor shaft 110A is connected with the second motor belt wheel 620A in such a manner that the rotation of the motor shaft 110A is transmitted to the second motor belt wheel 620A.

On the other hand, under a condition that the driving form of the driving part 30A is switched from the biaxial driving form to the drum uniaxial driving form, as shown in FIG. 17(b), the operation lever 842A is pushed out of the actuator 841A. The lower end part of the clutch lever 820A is pushed by the operation lever 842A to move forwards. The clutch lever 820A rotates backward by using the supporting shaft 831A as the center. The upper end part of the clutch lever 820A moves backwards. The clutch body 810A is pushed by the upper end part of the clutch lever 820A to move backwards. Thus, the first splines 817A of the clutch part 811A are disengaged from the splines 623A of the second motor belt wheel 620A. The motor shaft 110A is disconnected from the second motor belt wheel 620A in such a manner that the rotation of the motor shaft 110A is not transmitted to the second motor belt wheel 620A.

Other Change Embodiments

In the above embodiment and the change embodiment I, in the washing process of the second washing mode, the heater 60 is enabled to operate to heat the water in the outer drum 20. However, under a condition of giving priority to reduction of the power consumption compared with enhancement of the washing performance, in the washing process of the second washing mode in the above embodiment and the change embodiment I, the heater 60 can also be set not to operate so as not to heat the water in the outer drum 20. In this case, as shown in FIG. 9(b), treatments of step S203 to step S205 are deleted, and in FIG. 10(b), treatments of steps S203, S204 and S211 are deleted.

Further, in the above embodiment, the heater 60 is configured in the outer drum 20. However, as long as the water stored in the outer drum 20 for washing can be heated, the heater 60 can also be arranged outside the outer drum 20. For example, the heater 60 can be arranged on a water supply line from the water supply valve 51 to the outer drum 20, and a circulating line for circulating the water can be arranged between the water supply valve 51 and the outer drum 20, and the heater 60 is arranged on the circulating line.

Further, in the above embodiment, the drum 22 rotates by taking an inclination axis inclining relative to the horizontal direction as a center. However, the drum washing machine 1 can also adopt a structure that the drum 22 rotates by taking the horizontal direction as a center.

Further, although the drum washing machine 1 in the above embodiment does not have a clothes drying function, the present disclosure can be used for the drum washing machine with the clothes drying function, i.e., a drum type clothes washing and drying machine.

In addition, various changes can be properly made to embodiments of the present disclosure within a scope of technical concepts shown in a scope of claims.

What is claimed is:

1. A drum washing machine, comprising:
   an outer drum, configured in a shell;
   a drum, configured in the outer drum and operative to rotate by using a horizontal axis or an inclination axis inclining relative to a horizontal direction as a center;
   a rotating body, configured in the drum and provided with a protruding part in contact with washings on a surface of the rotating body;

a driving part, operative to operate in a first driving form and a second driving form, wherein the first driving form is a driving form in which the drum and the rotating body are operative to integrally rotate at a same rotating speed or the drum is operative to rotate and the rotating body is operative to be in a free rotation state, and the second driving form is a driving form in which the drum and the rotating body are operative to rotate at different rotating speeds;

a heater, configured to heat water stored in the outer drum for washing; and a control part, which is configured to at least performs washing operation of a first washing mode and a second washing mode, wherein the control part is configured to:

control the driving part to operate in the first driving form and control the heater to operate, in a washing process of the first washing mode; and control the driving part to operate in the second driving form, and control the heater to operate in such a manner that heat applied to the water is reduced compared with the first washing mode or not control the heater to operate, in a washing process of the second washing mode;

wherein the drum washing machine further comprises a temperature sensor configured to detect a temperature of the water stored in the outer drum and heated by the heater.

2. The drum washing machine according to claim 1, wherein the control part is configured to:

control the heater to operate in such a manner that a detection temperature of the temperature sensor reaches a first target temperature, in the washing process of the first washing mode; and control the heater to operate in such a manner that a detection temperature of the temperature sensor reaches a second target temperature lower than the first target temperature, in the washing process of the second washing mode.

3. The drum washing machine according to claim 2, further comprising a dirt sensor, configured to detect a dirt degree of washings;

wherein, in the washing process of the second washing mode, the control part is configured to control the heater to operate under a condition that the dirt degree detected by the dirt sensor is greater than a specified threshold, and control the heater not to operate under a condition that the dirt degree detected by the dirt sensor is less than the threshold.

4. The drum washing machine according to claim 1, wherein the control part is configured to:

control the heater to operate in such a manner that a detection temperature of the temperature sensor reaches a target temperature, and control the heater in such a manner that a detection temperature of the temperature sensor keeps the target temperature after reaching the target temperature, in the washing process of the first washing mode; and control the heater to operate in such a manner that a detection temperature of the temperature sensor reaches the target temperature, and stop the heater after reaching the target temperature, in the washing process of the second washing mode.

5. The drum washing machine according to claim 4, further comprising a dirt sensor, configured to detect a dirt degree of washings;

wherein, in the washing process of the second washing mode, the control part is configured to control the heater to operate under a condition that the dirt degree detected by the dirt sensor is greater than a specified threshold, and control the heater not to operate under a condition that the dirt degree detected by the dirt sensor is less than the threshold.

6. The drum washing machine according to claim 1, further comprising a dirt sensor, configured to detect a dirt degree of washings;

wherein, in the washing process of the second washing mode, the control part is configured to control the heater to operate under a condition that the dirt degree detected by the dirt sensor is greater than a specified threshold, and control the heater not to operate under a condition that the dirt degree detected by the dirt sensor is less than the threshold.

* * * * *